(12) United States Patent
Watanabe

(10) Patent No.: US 9,379,975 B2
(45) Date of Patent: Jun. 28, 2016

(54) COMMUNICATION CONTROL SYSTEM, CONTROL SERVER, FORWARDING NODE, COMMUNICATION CONTROL METHOD, AND COMMUNICATION CONTROL PROGRAM

(75) Inventor: Yoshikazu Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 247 days.

(21) Appl. No.: 13/990,033

(22) PCT Filed: Oct. 24, 2011

(86) PCT No.: PCT/JP2011/005928
§ 371 (c)(1),
(2), (4) Date: May 28, 2013

(87) PCT Pub. No.: WO2012/093429
PCT Pub. Date: Jul. 12, 2012

(65) Prior Publication Data
US 2013/0250958 A1   Sep. 26, 2013

(30) Foreign Application Priority Data

Jan. 5, 2011   (JP) ................. 2011-000738

(51) Int. Cl.
*H04L 12/56* (2006.01)
*H04L 12/741* (2013.01)
*H04L 29/12* (2006.01)

(52) U.S. Cl.
CPC ............... *H04L 45/74* (2013.01); *H04L 45/54* (2013.01); *H04L 61/103* (2013.01)

(58) Field of Classification Search
CPC ..................................................... H04L 45/74
See application file for complete search history.

(56) References Cited

U.S. PATENT DOCUMENTS 7,099,322 B1 *   8/2006   Frouin et al. ................. 370/390
7,957,300 B2     6/2011   Kaiduka et al.

(Continued)

FOREIGN PATENT DOCUMENTS

JP   2002-247089 A   8/2002
JP   2007-184988 A   7/2007

(Continued)

OTHER PUBLICATIONS

Heller et al, OpenFlow Switch Specification, Version 1.0.0 (Wire Protocol 0x01), Dec. 31, 2009.*
International Search Report (ISR) (PCT Form PCT/ISA/210) dated Dec. 13, 2011, in PCT/JP2011/005928.

(Continued)

*Primary Examiner* — Charles C Jiang
*Assistant Examiner* — Thad Defauw
(74) *Attorney, Agent, or Firm* — McGinn IP Law Group PLLC

(57) ABSTRACT

A communication control system includes a control server for controlling a process rule held in a forwarding node. The control server includes a network information storage unit for storing a logical network identifier which is an identifier of a logical network defined by setting of the forwarding node, and a correspondence relation between a device connected to the forwarding node and the logical network; and an address resolution unit for, upon receiving from the forwarding node an address resolution request for a destination communication device which is a destination of the packet or a communication device for forwarding the packet received from a source communication device which is a source of the packet to another device, performing interlayer address resolution for the destination communication device or the communication device, and setting the logical network identifier of the logical network to which the source communication device belongs.

20 Claims, 15 Drawing Sheets

(56) References Cited

U.S. PATENT DOCUMENTS

2003/0007482 A1\* 1/2003 Khello et al. ............... 370/352
2006/0182124 A1\* 8/2006 Cole et al. ............... 370/395.54
2011/0261825 A1 10/2011 Ichino

FOREIGN PATENT DOCUMENTS

| JP | 2009-212984 A | 9/2009 |
|----|---------------|--------|
| WO | WO 2010/103909 A1 | 9/2010 |

OTHER PUBLICATIONS

NPL 1: "OpenFlow Switch Specification", Version 1.0.0. (Wire Protocol 0x01) [search on Sep. 22, 2010], Internet <URL: http://www.openflowswitch.org/documents/openflow-spec-v1.0.0.pdf>, Dec. 31, 2009.

Hiroshi Ueno et al.,"A Study on Deployment of Network Appliance Functionalities in Datacenter Network," IEICE Technical Report, Nov. 13, 2009, vol. 109, No. 296, p. 7-12.

\* cited by examiner

Fig. 3

| USER NETWORK NAME | NETWORK IDENTIFIER |
|---|---|
| USER NETWORK 501 | 0x010000000501 |
| USER NETWORK 502 | 0x010000000502 |

(A) NETWORK IDENTIFIER LIST

| DEVICE NAME | PORT IDENTIFIER | USER NETWORK NAME |
|---|---|---|
| FORWARDING NODE 200-1 | 10~19 | USER NETWORK NAME 501 |
| FORWARDING NODE 200-2 | 10~19 | USER NETWORK NAME 501 |
| FORWARDING NODE 200-1 | 20~29 | USER NETWORK NAME 502 |
| FORWARDING NODE 200-3 | 20~29 | USER NETWORK NAME 502 |

(B) PORT/USER NETWORK CORRESPONDENCE LIST

Fig. 4

| DEVICE NAME | PORT IDENTIFIER | DEVICE NAME | PORT IDENTIFIER |
|---|---|---|---|
| COMMUNICATION DEVICE 300-1 | 1 | FORWARDING NODE 200-1 | 10 |
| COMMUNICATION DEVICE 300-2 | 1 | FORWARDING NODE 200-2 | 10 |
| COMMUNICATION DEVICE 300-3 | 1 | FORWARDING NODE 200-1 | 20 |
| COMMUNICATION DEVICE 300-4 | 1 | FORWARDING NODE 200-3 | 20 |
| FORWARDING NODE 200-1 | 100 | FORWARDING NODE 200-2 | 100 |
| FORWARDING NODE 200-1 | 101 | FORWARDING NODE 200-3 | 101 |
| FORWARDING NODE 200-2 | 102 | FORWARDING NODE 200-3 | 102 |

(A) COMMUNICATION DEVICE CONNECTION RELATION LIST

| DEVICE NAME | PORT IDENTIFIER | IP ADDRESS | MAC ADDRESS |
|---|---|---|---|
| COMMUNICATION DEVICE 300-1 | 1 | 192. 168. 100. 1 | 01:00:00:03:00:01 |
| COMMUNICATION DEVICE 300-2 | 1 | 192. 168. 200. 10 | 01:00:00:03:00:02 |
| COMMUNICATION DEVICE 300-3 | 1 | 192. 168. 100. 2 | 01:00:00:03:00:03 |
| COMMUNICATION DEVICE 300-4 | 1 | 192. 168. 200. 10 | 01:00:00:03:00:04 |

(B) ADDRESS LIST

Fig. 9

(A) FORWARDING NODE 200-1 FLOW TABLE

| INPUT PORT | MATCHING RULE | | | ACTION |
|---|---|---|---|---|
| | DESTINATION MAC ADDRESS | SOURCE MAC ADDRESS | DESTINATION IP ADDRESS | SOURCE IP ADDRESS | |

| INPUT PORT | DESTINATION MAC ADDRESS | SOURCE MAC ADDRESS | DESTINATION IP ADDRESS | SOURCE IP ADDRESS | ACTION |
|---|---|---|---|---|---|
| 10 | 01:00:00:00:05:01 | ANY | 192.168.200.0/24 | ANY | OUTPUT FROM PORT OF PORT IDENTIFIER 100 |
| 20 | 01:00:00:00:05:02 | ANY | 192.168.200.0/24 | ANY | OUTPUT FROM PORT OF PORT IDENTIFIER 101 |

(B) FORWARDING NODE 200-2 FLOW TABLE

| INPUT PORT | DESTINATION MAC ADDRESS | SOURCE MAC ADDRESS | DESTINATION IP ADDRESS | SOURCE IP ADDRESS | ACTION |
|---|---|---|---|---|---|
| 100 | 01:00:00:00:05:01 | ANY | 192.168.200.10 | ANY | CHANGE DESTINATION MAC ADDRESS OF PACKET TO 01:00:00:03:00:02 OUTPUT FROM PORT OF PORT IDENTIFIER 10 |

(C) FORWARDING NODE 200-3 FLOW TABLE

| INPUT PORT | DESTINATION MAC ADDRESS | SOURCE MAC ADDRESS | DESTINATION IP ADDRESS | SOURCE IP ADDRESS | ACTION |
|---|---|---|---|---|---|
| 101 | 01:00:00:00:05:02 | ANY | 192.168.200.10 | ANY | CHANGE DESTINATION MAC ADDRESS OF PACKET TO 01:00:00:03:00:04 OUTPUT FROM PORT OF PORT IDENTIFIER 20 |

Fig. 12

| INPUT PORT | MATCHING RULE | | | ACTION |
|---|---|---|---|---|
| | DESTINATION MAC ADDRESS | SOURCE MAC ADDRESS | DESTINATION IP ADDRESS | SOURCE IP ADDRESS | |
| 10 | 01:00:00:00:05:01 | ANY | 192.168.200.0/24 | ANY | OUTPUT FROM PORT OF PORT IDENTIFIER 100 |
| 20 | 01:00:00:00:05:02 | ANY | 192.168.200.0/24 | ANY | OUTPUT FROM PORT OF PORT IDENTIFIER 101 |

(A) FORWARDING NODE 200-1 FLOW TABLE

| INPUT PORT | MATCHING RULE | | | | ACTION |
|---|---|---|---|---|---|
| | DESTINATION MAC ADDRESS | SOURCE MAC ADDRESS | DESTINATION IP ADDRESS | SOURCE IP ADDRESS | |
| 100 | 01:00:00:00:05:01 | ANY | 192.168.200.10 | ANY | CHANGE DESTINATION MAC ADDRESS OF PACKET TO 01:00:00:03:00:02 CHANGE SOURCE MAC ADDRESS OF PACKET TO 01:00:00:00:05:01 OUTPUT FROM PORT OF PORT IDENTIFIER 10 |

(B) FORWARDING NODE 200-2 FLOW TABLE

| INPUT PORT | MATCHING RULE | | | | ACTION |
|---|---|---|---|---|---|
| | DESTINATION MAC ADDRESS | SOURCE MAC ADDRESS | DESTINATION IP ADDRESS | SOURCE IP ADDRESS | |
| 101 | 01:00:00:00:05:02 | ANY | 192.168.200.10 | ANY | CHANGE DESTINATION MAC ADDRESS OF PACKET TO 01:00:00:03:00:04 CHANGE SOURCE MAC ADDRESS OF PACKET TO 01:00:00:00:05:02 OUTPUT FROM PORT OF PORT IDENTIFIER 20 |

(C) FORWARDING NODE 200-3 FLOW TABLE

COMMUNICATION CONTROL SYSTEM, CONTROL SERVER, FORWARDING NODE, COMMUNICATION CONTROL METHOD, AND COMMUNICATION CONTROL PROGRAM

TECHNICAL FIELD

The present invention relates to a communication control system, a control server, a forwarding node, a communication control method, and a communication control program for performing centralized control of packet communication paths.

BACKGROUND ART

A technology called OpenFlow is proposed in recent years (see Non Patent Literature (NPL) 1). OpenFlow is a technology that treats communication as an end-to-end flow, and performs path control and the like on a flow-by-flow basis. A network based on OpenFlow (hereafter referred to as an OpenFlow network) includes an OpenFlow controller (hereafter also referred to as an OFC) for performing path control and an OpenFlow switch (hereafter also referred to as an OFS) for forwarding a packet based on a path determined by the OpenFlow controller.

In OpenFlow, path information is represented by a flow entry that includes: a packet matching rule for associating a packet with a flow; and an action for designating an operation to be performed by the OpenFlow switch in the case of receiving the flow. The packet matching rule is expressed as a condition corresponding to field values of various headers in the packet. Examples of such field values of various headers include an Ethernet (registered trademark) header, an IP (Internet Protocol) header, a TCP (Transmission Control Protocol) header, and so on.

The condition designated as the packet matching rule may be a condition of being exactly equal to a specific value, or a condition of satisfying an arbitrary value or a specific condition (e.g. an IP address is included in a specific IP subnet). Meanwhile, examples of the action include outputting from a designated port, discarding, modifying a specific field in a header, and so on. Note that it is possible to designate a plurality of actions in one flow entry.

An outline (example) of a process of forwarding a packet in the OpenFlow network is shown below.

1. The OpenFlow switch receives the packet.
2. The OpenFlow switch searches a flow entry list (flow table) set in the OpenFlow switch, for a flow entry including a packet matching rule that matches the received packet.
3. In the case where the flow entry is found in the flow table, the OpenFlow switch applies an action of the flow entry to the received packet, and ends the process.
4. In the case where the flow entry is not found in the flow table, the OpenFlow switch sends the received packet to the OpenFlow controller.
5. The OpenFlow controller determines a path and a process for the received packet, and instructs the OpenFlow switch to add the flow entry.

A packet routing method that employs a VPN (Virtual Private Network) is described in Patent Literature (PTL) 1. In the method described in PTL 1, upon receipt of a packet including a VLAN (Virtual Local Area Network) tag that indicates where a terminal belongs to, the received packet is transmitted to a corresponding virtual hub based on the VLAN tag. Each virtual hub learns a relation between a source MAC (Media Access Control) address in a user MAC header of a received packet and a terminal-side virtual interface termination through which the packet has passed.

A packet forwarding device for collectively handling a plurality of flows is described in PTL 2. The packet forwarding device described in PTL 2 outputs a flow bundle identifier common to flows identified based on header information of an input packet, and performs predetermined arithmetic processing on the flow bundle identifier.

A network management device is described in PTL 3. The network management device described in PTL 3 stores link information indicating connection relations between nodes in a physical network and information of a logical network to which the link information belongs.

CITATION LIST

Patent Literature

PTL 1: 2002-247089
PTL 2: 2007-184988
PTL 3: 2009-212984

Non Patent Literature

NPL 1: "OpenFlow Switch Specification", Version 1.0.0. (Wire Protocol 0x01) [search on Sep. 22, 2010], Internet<URL: http://www.openflowswitch.org/documents/openflow-spec-v1.0.0.pdf>, Dec. 31, 2009

SUMMARY OF INVENTION

Technical Problem

In the case of realizing a communication network by OpenFlow, it is desirable that a communication device (such as a server or a client) which connects to and communicates with the OpenFlow switch is not required to have any special function. In other words, it is desirable that the communication device which connects to the OpenFlow switch can perform communication using a conventional TCP/IP protocol. The communication device executes an ARP (Address Resolution Protocol)-based process for address resolution between an IP layer and an Ethernet layer, before sending an IP packet. To do so, the communication device sends an ARP request packet including an IP address subjected to resolution, to a L2 (Layer 2) broadcast address. In ARP, a target communication device assigned the IP address subjected to resolution is required to return an ARP reply packet including a MAC address of the target communication device, upon receiving the ARP request.

In a typical TCP/IP network, the requesting communication device and the communication device assigned the IP address subjected to resolution tend to belong to the same L2 broadcast domain and be connected to the same Ethernet switch or adjacent Ethernet switches. Accordingly, the destination of the ARP request packet is limited to the L2 broadcast domain.

In the OpenFlow network, on the other hand, communication devices having IP addresses in the same subnet are connectable to any OpenFlow switches in the OpenFlow network. Therefore, in order to deliver the ARP request packet to the target communication device by broadcasting, it is necessary to send the ARP request packet to the whole OpenFlow network. This raises a need to achieve efficient interlayer address resolution in the OpenFlow network.

In the case of implementing multitenancy using a network of a data center or the like, a physical network is shared by a plurality of customers. That is, a network (hereafter referred to as a user network) of each customer is serviced using a common physical network. Normally, an IP address space used by each customer is independently managed, and so there is a possibility that a plurality of customers use overlapping IP address spaces. Hence, in the data center it is necessary to multiplex traffic of each user network without depending on the used IP address.

In a typical network, multiplexing is performed using a VLAN (Virtual Local Area Network). In the method of multiplexing using the VLAN, however, the number of networks that can be identified is limited to 4094. On the other hand, when the OpenFlow network is applied, even if different IP address exist on a traffic, it is possible to route each packet having each IP address as it can be recognized each flow corresponding to each network. For example, by identifying a flow using not only an IP address but also a MAC address, it is possible to multiplex a plurality of network services that use overlapping address spaces.

In the case of using the OpenFlow network, however, there is a possibility that the number of flow entries increases. This makes it desirable to aggregate flow entries. As mentioned earlier, a condition matching a plurality of values can be designated in a packet matching rule of a flow entry. For example, suppose a group of communication devices belonging to one subnet is connected to the same OpenFlow switch. In such a case, creating a separate flow entry for each communication device causes an increase in the number of flow entries. The number of flow entries, however, can be reduced by aggregating the individual flow entries of the communication devices into one flow entry for the subnet. Thus, the flow entries set in other OpenFlow switches with regard to the group of communication devices can be aggregated.

In the case of identifying a flow using not only an IP address but also a MAC address in order to multiplex a plurality of network services that use overlapping address spaces, however, it is difficult to apply the above-mentioned aggregation method. Since a different MAC address is assigned to each communication device, the flow entries cannot be aggregated. Accordingly, the number of flow entries set in the OpenFlow switches cannot be reduced. It is desirable that the flow entries can be aggregated even in the case of multiplexing a plurality of network services that use overlapping address spaces.

The packet routing method described in PTL 1 is based on a premise that, in order to direct a packet received from a terminal to a corresponding virtual hub in a router, identification information such as a VLAN tag is included in the packet beforehand. It is desirable that traffic of each user network can be multiplexed without a need to be aware of such identification information on a communication device side.

In view of the above, an exemplary object of the present invention is to provide a communication control system, a control server, a forwarding node, a communication control method, and a communication control program that can perform interlayer address resolution efficiently and, in the case of multiplexing a plurality of network services, aggregate flow entries indicating processes for packets.

Solution to Problem

A communication control system according to the present invention is a communication control system comprising: a forwarding node for holding a process rule defining a feature of a packet and a process for the packet corresponding to the feature, and processing the packet received from another device based on the process rule; and a control server for controlling the process rule held in the forwarding node, wherein the control server includes: network information storage means for storing a logical network identifier which is an identifier of a logical network defined by setting of the forwarding node, and a correspondence relation between a device connected to the forwarding node and the logical network; and address resolution means for, upon receiving from the forwarding node an address resolution request for a destination communication device which is a destination of the packet or a communication device for forwarding the packet received from a source communication device which is a source of the packet to another device, performing interlayer address resolution for the destination communication device or the communication device, and setting the logical network identifier of the logical network to which the source communication device belongs, in a resolved address which is an address obtained as a result of the address resolution.

A control server according to the present invention is a control server for controlling a process rule that is held in a forwarding node for processing a packet received from another device based on the process rule and that defines a feature of the packet and a process for the packet corresponding to the feature, the control server comprising: network information storage means for storing a logical network identifier which is an identifier of a logical network defined by setting of the forwarding node, and a correspondence relation between a device connected to the forwarding node and the logical network; and address resolution means for, upon receiving from the forwarding node an address resolution request for a destination communication device which is a destination of the packet or a communication device for forwarding the packet received from a source communication device which is a source of the packet to another device, performing interlayer address resolution for the destination communication device or the communication device, and setting the logical network identifier of the logical network to which the source communication device belongs, in a resolved address which is an address obtained as a result of the address resolution.

A forwarding node according to the present invention is a forwarding node for holding a process rule defining a feature of a packet and a process for the packet corresponding to the feature, and processing the packet received from another device based on the process rule, the forwarding node comprising: network information storage means for storing a logical network identifier which is an identifier of a logical network defined by setting of the forwarding node, and a correspondence relation between a device connected to the forwarding node and the logical network; and address resolution means for, upon receiving, from a source communication device which is a source of the packet, an address resolution request for a destination communication device which is a destination of the packet or a communication device for forwarding the packet received from the source communication device to another device, performing interlayer address resolution for the destination communication device or the communication device, and setting the logical network identifier of the logical network to which the source communication device belongs, in a resolved address which is an address obtained as a result of the address resolution.

A communication control method according to the present invention is a communication control method wherein a control server including network information storage means for storing: a logical network identifier which is an identifier of a logical network defined by setting of a forwarding node for processing a packet received from another device based on a process rule defining a feature of the packet and a process for the packet corresponding to the feature; and a correspondence relation between a device connected to the forwarding node and the logical network performs, upon receiving from the forwarding node an address resolution request for a destination communication device which is a destination of the packet or a communication device for forwarding the packet received from a source communication device which is a source of the packet to another device, interlayer address resolution for the destination communication device or the communication device, and wherein the control server sets the logical network identifier of the logical network to which the source communication device belongs, in a resolved address which is an address obtained as a result of the address resolution.

A communication control program according to the present invention is a communication control program applied to a computer for controlling a process rule that is held in a forwarding node for processing a packet received from another device based on the process rule and that defines a feature of the packet and a process for the packet corresponding to the feature, the computer including network information storage means for storing a logical network identifier which is an identifier of a logical network defined by setting of the forwarding node, and a correspondence relation between a device connected to the forwarding node and the logical network, the communication control program causing the computer to execute an address resolution process of, upon receiving from the forwarding node an address resolution request for a destination communication device which is a destination of the packet or a communication device for forwarding the packet received from a source communication device which is a source of the packet to another device, performing interlayer address resolution for the destination communication device or the communication device, and setting the logical network identifier of the logical network to which the source communication device belongs, in a resolved address which is an address obtained as a result of the address resolution.

Another communication control program according to the present invention is a communication control program applied to a computer for holding a process rule defining a feature of a packet and a process for the packet corresponding to the feature, a logical network identifier which is an identifier of a logical network defined by setting of the computer, and a correspondence relation between a device connected to the computer and the logical network, and processing the packet received from another device based on the process rule, the communication control program causing the computer to execute an address resolution process of, upon receiving, from a source communication device which is a source of the packet, an address resolution request for a destination communication device which is a destination of the packet or a communication device for forwarding the packet received from the source communication device to another device, performing interlayer address resolution for the destination communication device or the communication device, and setting the logical network identifier of the logical network to which the source communication device belongs, in a resolved address which is an address obtained as a result of the address resolution.

Advantageous Effects of Invention

According to the present invention, interlayer address resolution can be performed efficiently and, in the case of multiplexing a plurality of network services, flow entries indicating processes for packets can be aggregated.

BRIEF DESCRIPTION OF DRAWINGS

FIG. 3 is an explanatory diagram showing an example of network information.

FIG. 4 is an explanatory diagram showing an example of topology information.

FIG. 9 is an explanatory diagram showing an example of a flow table.

FIG. 12 is an explanatory diagram showing an example of a flow table.

DESCRIPTION OF EMBODIMENTS

Figure 1:
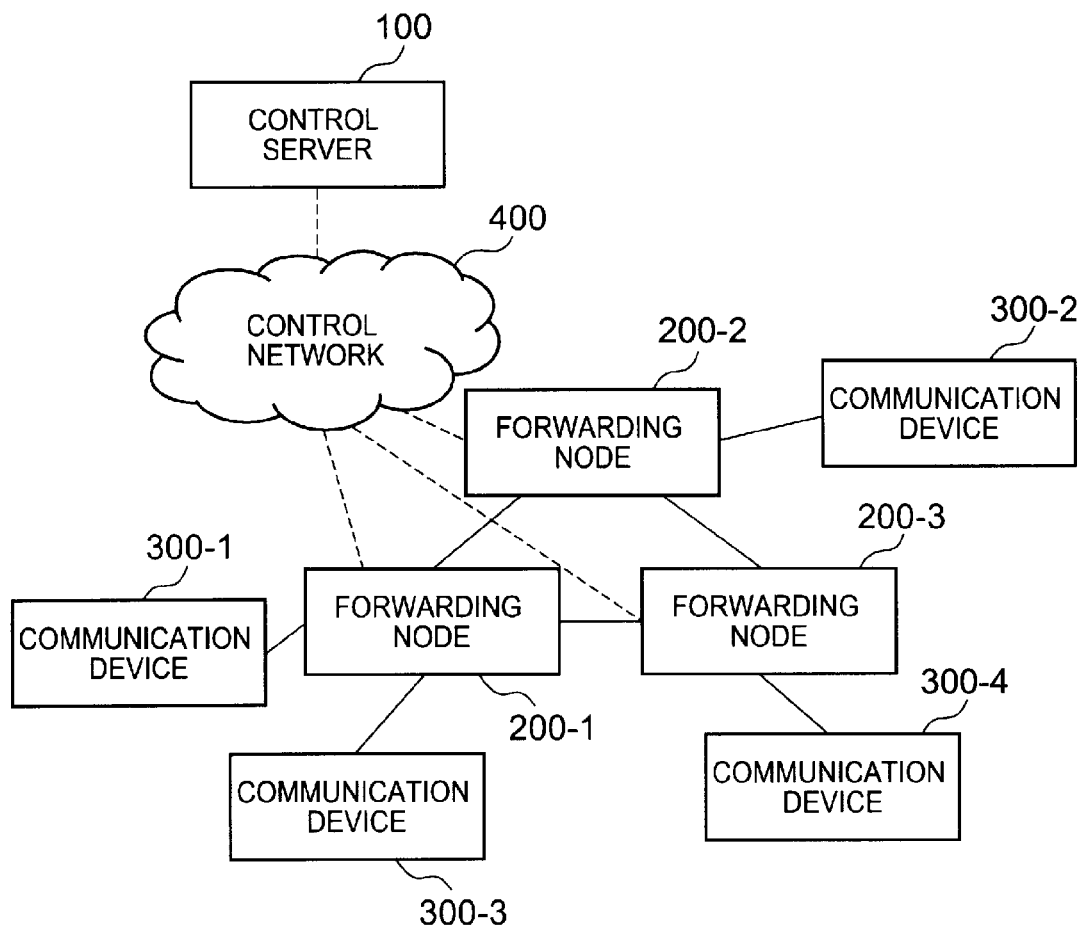
FIG. 1 is an explanatory diagram showing an example of a structure of a communication control system according to the present invention.

A structure and an operation common to exemplary embodiments of the present invention are briefly described first. FIG. 1 is an explanatory diagram showing an example of a structure of a communication control system according to the present invention. The communication control system illustrated in FIG. 1 includes a control server 100, forwarding nodes 200-1 to 200-3, communication devices 300-1 to 300-4, and a control network 400.

The forwarding nodes 200-1 to 200-3 each connect to and communicate with another forwarding node and a communication device. In the example shown in FIG. 1, paths of communication performed by the forwarding nodes 200-1 to 200-3 are shown by solid lines. Moreover, the forwarding nodes 200-1 to 200-3 each connect to the control network 400, and perform control communication (control channel) with the control server 100 via the control network 400. In the example shown in FIG. 1, paths of communication performed between the control server 100 and the forwarding nodes 200-1 to 200-3 are shown by dashed lines. Note that the numbers of devices and their connection relations in FIG. 1 are merely an example, and the communication control system according to the present invention is not limited to the structure illustrated in FIG. 1.

Furthermore, the forwarding nodes 200-1 to 200-3 each receive a packet from a communication device or another forwarding node connected with the forwarding node, and process the received packet based on a process rule (flow entry) included in a flow table held in the forwarding node. In detail, the forwarding nodes 200-1 to 200-3 are each a node that performs some kind of process on the received packet or forwards the received packet to another device. The forwarding nodes 200-1 to 200-3 each notify the control server 100 of the received packet in the case where the flow entry corresponding to the received packet does not exist in the flow table. The forwarding nodes 200-1 to 200-3 are each a device corresponding to an OpenFlow switch in the OpenFlow network.

The control server 100 receives a packet whose corresponding flow entry (process rule) does not exist from any of the forwarding nodes 200-1 to 200-3, and computes a path of the packet. The control server 100 is a server for controlling communication in the communication control system by instructing the forwarding nodes 200-1 to 200-3 to add a flow entry corresponding to a received packet. In detail, the control server 100 issues an instruction to change, such as add or delete, a process rule in the forwarding nodes 200-1 to 200-3. Hence, the control server 100 can be regarded as a device for controlling a process rule held in a forwarding node. The control server 100 is a device corresponding to an OpenFlow controller in the OpenFlow network.

The communication devices 300-1 to 300-4 are each a communication device that uses a communication protocol requiring an interlayer address resolution protocol to be executed between a higher layer communication protocol and a lower layer communication protocol, in a process of communicating with another communication device (communication device). In detail, the communication devices 300-1 to 300-4 each perform address resolution between a higher layer and a lower layer, according to the address resolution protocol. The following description takes an example where the communication devices 300-1 to 300-4 use IP as the higher layer protocol, Ethernet as the lower layer protocol, and ARP as the interlayer address resolution protocol.

The control network 400 is a communication network enabling communication of control messages between the control server 100 and the forwarding nodes 200-1 to 200-3. For example, the control network 400 is realized as a network in which an Ethernet switch, an IP router, and the like are connected to each other.

In the communication control system according to the present invention, a network identifier (logical network identifier) for identifying each user network (logical network) serviced by the forwarding nodes 200-1 to 200-3 is utilized in a physical network formed using the forwarding nodes 200-1 to 200-3. A user network mentioned here is a logical network defined by setting of a forwarding node. Servicing a user network by a forwarding node means that a process (e.g. a forwarding process or a discarding process) for each packet used in communication in the user network is performed by the forwarding node.

In the communication control system according to the present invention, in the case where any of the communication devices 300-1 to 300-4 requests interlayer address resolution, the following process is performed: returning a network identifier of a user network to which the communication device belongs, to the communication device as an address as a result of resolution (resolved address). Moreover, in the communication control system according to the present invention, a network identifier is used for identifying a flow.

Exemplary embodiments of the present invention are described below, with reference to drawings.

The following description is based on an assumption that two user networks 501 and 502 (not shown) using IP are serviced by the forwarding nodes 200-1 to 200-3. That is, the forwarding nodes 200-1 to 200-3 each perform a packet forwarding process and the like, for the two user networks 501 and 502. It is also assumed that the communication devices 300-1 and 300-2 belong to the user network 501 and the communication devices 300-3 and 300-4 belong to the user network 502, where the user networks 501 and 502 both use an IP address space "192.168.0.0/16". Hereafter, in description common to the forwarding nodes 200-1 to 200-3, each of the forwarding nodes 200-1 to 200-3 may be simply referred to as the forwarding node.

Exemplary Embodiment 1

Figure 2:
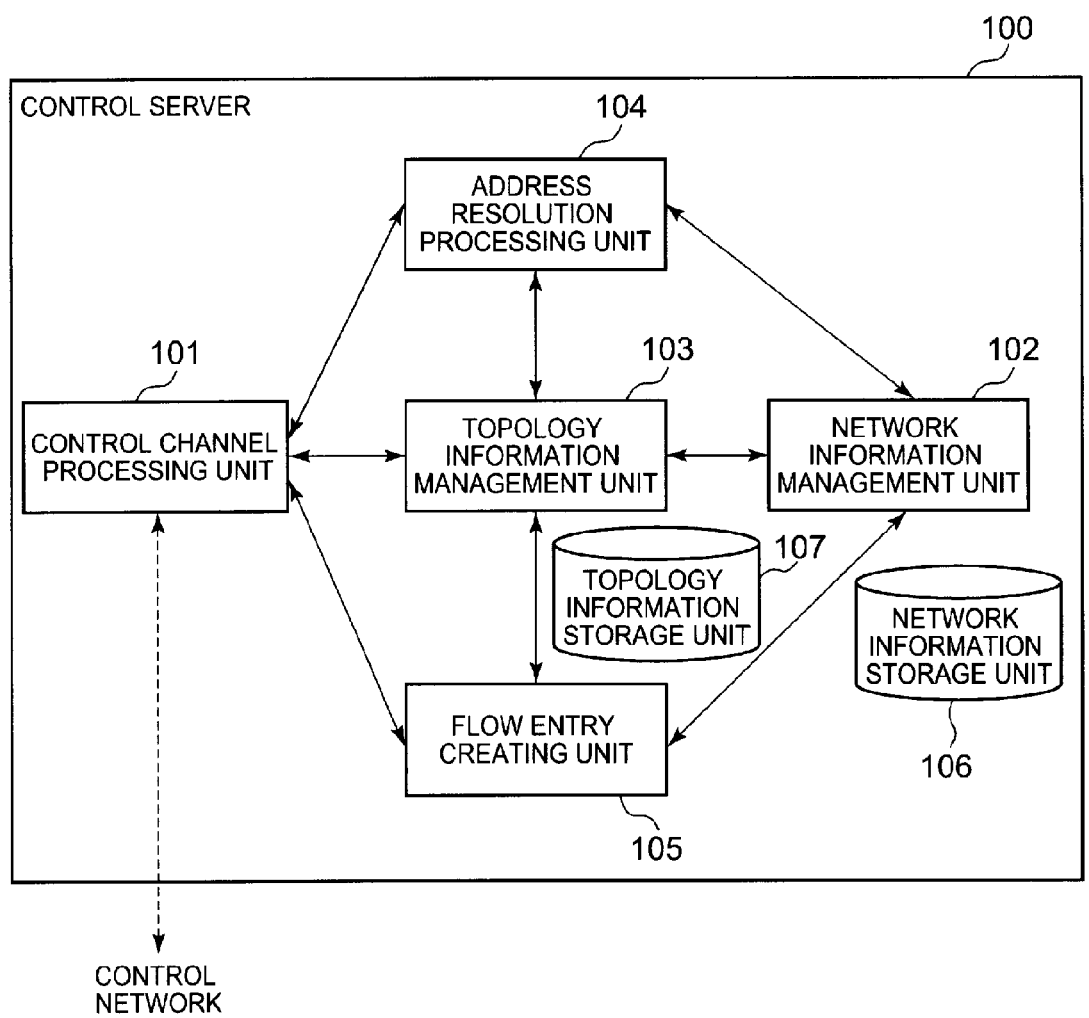
FIG. 2 is a block diagram showing an example of a structure of a control server.

FIG. 2 is a block diagram showing an example of a structure of the control server 100. The control server 100 illustrated in FIG. 2 includes a control channel processing unit 101, a network information management unit 102, a topology information management unit 103, an address resolution processing unit 104, a flow entry creating unit 105, a network information storage unit 106, and a topology information storage unit 107.

The control channel processing unit 101 is connected to the control network 400, and performs control communication (control channel) with a control channel processing unit 201 in each of the forwarding nodes 200-1 to 200-3 described later, via the control network 400. Examples of communication by the control channel include: notifying a packet from the forwarding node to the control server 100; sending a packet from the control server 100 to the forwarding node; and instructing the forwarding node to add, delete, or modify a flow entry by the control server 100.

The network information storage unit 106 stores network information (logical network information) about the user networks serviced by the forwarding nodes 200-1 to 200-3. In Exemplary Embodiment 1, the network information storage unit 106 stores the network identifier for identifying each user network and correspondence relations between ports in the forwarding nodes 200-1 to 200-3 and the user networks, as the network information.

The network information may be manually set in the network information storage unit 106. Alternatively, the network information may be automatically set in the network information storage unit 106. For instance, when a communication device connects to a forwarding node, the network information management unit 102 described later executes IEEE 802.1X authentication. The network information management unit 102 specifies a user network to which the connected communication device belongs, based on information obtained at the time of authentication. The network information management unit 102 then stores a correspondence relation between a port of the forwarding node to which the communication device is connected and the user network, in the network information storage unit 106. In this way, the network information can be automatically set in the network information storage unit 106.

FIG. 3 is an explanatory diagram showing an example of the network information stored in the network information storage unit 106. FIG. 3(A) shows an example of a list indicating the network identifier of each user network. FIG. 3(B) shows an example of a list indicating which user network a communication device connected to each port of the forwarding nodes 200-1 to 200-3 belongs to. For instance, the first line of the list illustrated in FIG. 3(B) indicates that a communication device connected to a port of any of port identifiers 10 to 19 in the forwarding node 200-1 belongs to the user network 501.

The network information management unit 102 manages the network information stored in the network information storage unit 106. In detail, the network information management unit 102 returns the network information stored in the network information storage unit 106, in response to a request from another device. The network information management unit 102 also performs addition, update, deletion, or the like on the network information stored in the network information storage unit 106.

The topology information storage unit 107 stores network topology information (hereafter simply referred to as topology information). Examples of the topology information stored in the topology information storage unit 107 include: connection relations between forwarding nodes and between forwarding nodes and communication devices; and a higher layer address (IP address) and a lower layer address (MAC address) used by each communication device.

FIG. 4 is an explanatory diagram showing an example of the topology information stored in the topology information storage unit 107. FIG. 4(A) shows an example of a list indicating the connection relations between the forwarding nodes and between the forwarding nodes and the communication devices. For instance, the first line of the list illustrated in FIG. 4(A) indicates that a port of a port identifier 1 of the communication device 300-1 and a port of a port identifier 10 of the forwarding node 200-1 are connected to each other.

FIG. 4(B) shows an example of a list of the IP address and the MAC address used by each communication device. For instance, the first line of the list illustrated in FIG. 4(B) indicates that the port of the port identifier 1 of the communication device 300-1 uses an IP address "192.168.100.1" and a MAC address "01:00:00:03:00:01".

The topology information management unit 103 detects a network topology in the communication control system, and manages the network topology as the topology information. In detail, the topology information management unit 103 stores the detected topology information in the topology information storage unit 107. The topology information management unit 103 may use the control channel, for sending/receiving a packet relating to topology detection to/from an arbitrary port of an arbitrary forwarding node.

A typical method is used as a method of detecting the topology by the topology information management unit 103. Example techniques of topology detection by the topology information management unit 103 include LLDP (Link Layer Discovery Protocol), cooperation with DHCP (Dynamic Host Configuration Protocol) snooping or a DHCP server, cooperation with user authentication (e.g. IEEE 802.1X), detection of a gratuitous ARP packet sent from a communication device, and STP (Spanning Tree Protocol).

The address resolution processing unit 104 receives an address resolution request (ARP request) sent from a communication device via the control channel processing unit 101, and creates an address resolution reply (ARP reply). Here, the address resolution processing unit 104 creates the ARP reply that includes a network identifier of a user network to which the communication device sending the ARP request belongs, as a MAC address (resolved address) corresponding to an IP address for which resolution is requested in the ARP request.

In detail, upon receiving an address resolution request (ARP request) for a destination communication device (the communication device 300-2 in this example) from the forwarding node 200-1, the address resolution processing unit 104 performs interlayer address resolution (ARP reply) of the destination communication device. For example, upon receiving an IP address which is a higher layer address from the forwarding node 200-1, the address resolution processing unit 104 resolves a MAC address which is a lower layer address.

The address resolution processing unit 104 then sets a logical network identifier of a logical network to which a source communication device of a packet belongs, in the address (resolved address) obtained as a result of address resolution. For instance, the address resolution processing unit 104 sets the logical network identifier of the logical network to which the communication device (the communication device 300-1 in this example) sending the ARP request belongs, in the lower layer address (MAC address in this example) included in the resolved address (ARP reply).

The flow entry creating unit 105 performs path computation and creates a flow entry, in response to a request from the control channel processing unit 101. In detail, upon receiving a flow entry creation request from a forwarding node via the control channel processing unit 101, the flow entry creating unit 105 first computes a path of a flow subjected to flow entry creation. A typical method is used as a method of computing the path by the flow entry creating unit 105.

For example, the flow entry creating unit 105 may compute the path by a shortest path method, or compute the path based on STP (Spanning Tree Protocol). After computing the path, the flow entry creating unit 105 creates a flow entry to be added for each forwarding node on the computed path. The flow entry creating unit 105 then notifies the control channel processing unit 101 of the created flow entry. The control channel processing unit 101 sends the notified flow entry to each forwarding node, thereby instructing the forwarding node to add the flow entry as a process rule.

The control channel processing unit 101, the network information management unit 102, the topology information management unit 103, the address resolution processing unit 104, and the flow entry creating unit 105 are realized by a CPU of a computer operating according to a program (communication control program). For example, the program may be stored in a storage unit (not shown) in the control server 100, with the CPU reading the program and, according to the program, operating as the control channel processing unit 101, the network information management unit 102, the topology information management unit 103, the address resolution processing unit 104, and the flow entry creating unit 105. Alternatively, the control channel processing unit 101, the network information management unit 102, the topology information management unit 103, the address resolution processing unit 104, and the flow entry creating unit 105 may be each realized by dedicated hardware.

Meanwhile, the network information storage unit 106 and the topology information storage unit 107 are realized by a magnetic disk or the like.

Figure 5:
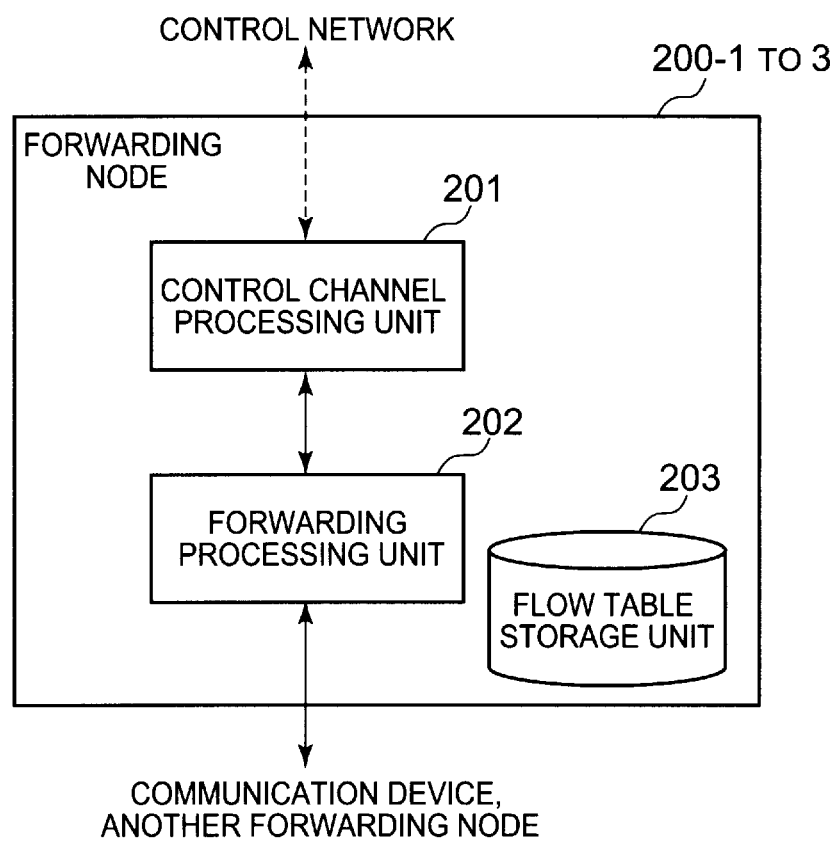
FIG. 5 is a block diagram showing an example of a structure of a forwarding node.

FIG. 5 is a block diagram showing an example of a structure of each of the forwarding nodes 200-1 to 200-3. Each of the forwarding nodes 200-1 to 200-3 illustrated in FIG. 5 includes the control channel processing unit 201, a forwarding processing unit 202, and a flow table storage unit 203.

The control channel processing unit 201 is connected to the control network 400, and performs control communication (control channel) with the control channel processing unit 101 in the control server 100 via the control network 400. When notified of a packet whose corresponding flow entry does not exist from the forwarding processing unit 202, the control channel processing unit 201 notifies the control server 100 of the packet using the control channel.

Moreover, upon receiving an instruction to add, modify, or delete a flow entry from the control server 100 via the control channel, the control channel processing unit 201 instructs the forwarding processing unit 202 to change the flow table based on the received instruction. Upon receiving an instruction to output a packet from the control server 100 via the control channel, the control channel processing unit 201 instructs the forwarding processing unit 202 to output the packet based on the received instruction.

The flow table storage unit 203 stores the flow table including a process rule (flow entry). The process rule (flow entry) is stored in the flow table storage unit 203 by the forwarding processing unit 202 described later.

The forwarding processing unit 202 is connected to another device (e.g. a communication device or another forwarding node), and sends/receives a packet to/from the connected device. The forwarding processing unit 202 also manages the flow table stored in the flow table storage unit 203.

Upon receiving a packet from another device, the forwarding processing unit 202 searches the flow table for a flow entry corresponding to the received packet. In the case where the flow entry corresponding to the received packet is found in the flow table, the forwarding processing unit 202 performs a process according to an action of the flow entry. In the case where the flow entry corresponding to the received packet is not found in the flow table, the forwarding processing unit 202 notifies the control channel processing unit 201 that the flow entry corresponding to the received packet does not exist.

The forwarding processing unit 202 includes a plurality of ports for communicating with another device. Each of the plurality of ports is connected to a different one of ports of other forwarding nodes or communication devices. Each of the plurality of ports is identified by a port identifier.

Examples of the process performed by the forwarding processing unit 202 according to the action of the flow entry include the following processes. Note that the number of processes performed by the forwarding processing unit 202 is not limited to one, and may be two or more. Besides, the process designated by the action of the flow entry is not limited to the following processes.

Outputting a packet from a designated port

Changing a destination MAC address of a packet to a designated value

Changing a source MAC address of a packet to a designated value

Changing a destination IP address of a packet to a designated value

Changing a source IP address of a packet to a designated value

Changing a destination port number of a packet to a designated value

Changing a source port number of a packet to a designated value

Adding a VLAN tag to a packet

Deleting a VLAN tag in a packet

Changing a VLAN tag in a packet

The control channel processing unit 201 and the forwarding processing unit 202 are realized by a CPU of a computer operating according to a program. Alternatively, the control channel processing unit 201 and the forwarding processing unit 202 may be each realized by dedicated hardware.

Figure 6:
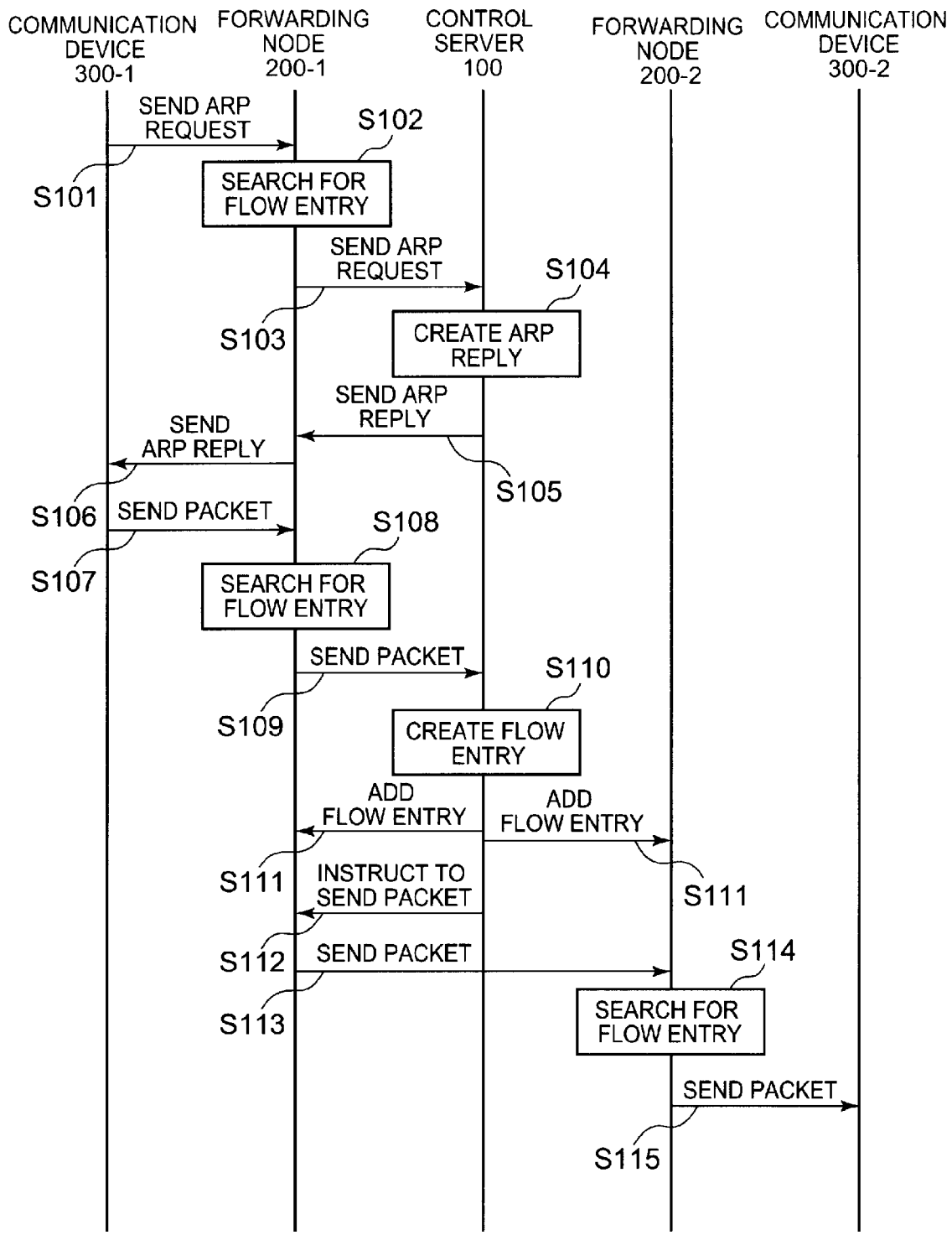
FIG. 6 is a sequence diagram showing an example of an operation of a communication control system in Exemplary Embodiment 1 of the present invention.

The following describes an operation of the communication control system in Exemplary Embodiment 1. FIG. 6 is a sequence diagram showing an example of the operation of the communication control system in Exemplary Embodiment 1. An operation when a communication device connected to the communication control system according to the present invention sends a packet is described below, with reference to the sequence diagram shown in FIG. 6. In detail, the communication device 300-1 performs address resolution of an IP address of the communication device 300-2, and sends a packet destined to the communication device 300-2. It is assumed here that, before the operation illustrated in FIG. 6 starts, the communication device 300-1 knows the IP address of the communication device 300-2 but does not know a MAC address of the communication device 300-2, a flow entry relating to communication from the communication device 300-1 to the communication device 300-2 is not set in the forwarding nodes 200-1 to 200-3, and the control server 100 has already obtained (computed) the topology information and the network information.

First, the communication device 300-1 sends an ARP request in which the IP address (target protocol address) subjected to resolution is the IP address of the communication device 300-2, to the forwarding node 200-1 (step S101). When the forwarding node 200-1 receives the ARP request, the forwarding processing unit 202 in the forwarding node 200-1 searches for a flow entry corresponding to the received ARP request (step S102). In this case, however, the flow entry corresponding to the received ARP request does not exist in the flow table. Accordingly, the control channel processing unit 201 in the forwarding node 200-1 sends the received ARP request to the control server 100 via the control channel (step S103).

When the control server 100 receives the ARP request sent in step S103, the address resolution processing unit 104 in the control server 100 creates an ARP reply to the received ARP request (step S104). A detailed operation of the control server 100 when creating the ARP reply will be described later.

The control channel processing unit 101 in the control server 100 instructs the forwarding node 200-1 to send the ARP reply created in step S104 to the communication device 300-1, via the control channel (step S105).

Upon receiving the ARP reply sent in step S105, the forwarding processing unit 202 in the forwarding node 200-1 sends the received ARP reply to the communication device 300-1 (step S106). Upon receiving the ARP reply, the communication device 300-1 creates a corresponding ARP cache entry based on the received ARP reply.

The communication device 300-1 sends the packet destined to the communication device 300-2, to the forwarding node 200-1 (step S107). Here, a MAC address in a sender hardware address field in the ARP reply is set in a destination MAC address of the sent packet, and a MAC address of the communication device 300-1 is set in a source MAC address of the sent packet. In addition, the IP address of the communication device 300-2 is set in a destination IP address of the sent packet, and an IP address of the communication device 300-1 is set in a source IP address of the sent packet. The packet sent from the communication device 300-1 is hereafter referred to as a processing target packet.

When the forwarding node 200-1 receives the processing target packet, the forwarding processing unit 202 in the forwarding node 200-1 searches the flow table for a flow entry corresponding to the received processing target packet (step S108). In this case, however, the flow entry corresponding to the processing target packet does not exist in the flow table. Accordingly, the control channel processing unit 201 in the forwarding node 200-1 sends the processing target packet to the control server 100 via the control channel (step S109). Here, the forwarding processing unit 202 in the forwarding node 200-1 stores the processing target packet in a queue, for subsequent sending.

The flow entry creating unit 105 in the control server 100 creates a flow entry corresponding to the processing target packet (step S110). A detailed operation of the control server 100 when creating the flow entry will be described later.

The control channel processing unit 101 in the control server 100 instructs the forwarding nodes 200-1 and 200-2 to add the flow entry created in step S110 to the flow table, via the control channel (step S111). The forwarding processing unit 202 in each of the forwarding nodes 200-1 and 200-2 receiving the instruction adds the flow entry to the flow table. The control channel processing unit 101 in the control server 100 also instructs the forwarding node 200-1 to process the processing target packet stored in the queue in the forwarding node 200-1 in step S108, according to the flow table (step S112).

The forwarding processing unit 202 in the forwarding node 200-1 sends the processing target packet to the forwarding node 200-2, according to the flow entry added in step S111 (step S113).

When the forwarding node 200-2 receives the processing target packet, the forwarding processing unit 202 in the forwarding node 200-2 searches the flow table for the flow entry corresponding to the received processing target packet (step S114). In this case, the flow entry added in step S111 exists in the flow table, so that the forwarding processing unit 202 in the forwarding node 200-2 can find the flow entry corresponding to the processing target packet. Accordingly, the forwarding processing unit 202 in the forwarding node 200-2 sends the processing target packet to the communication device 300-2, based on the action of the flow entry found in step S114 (step S115).

Figure 7:
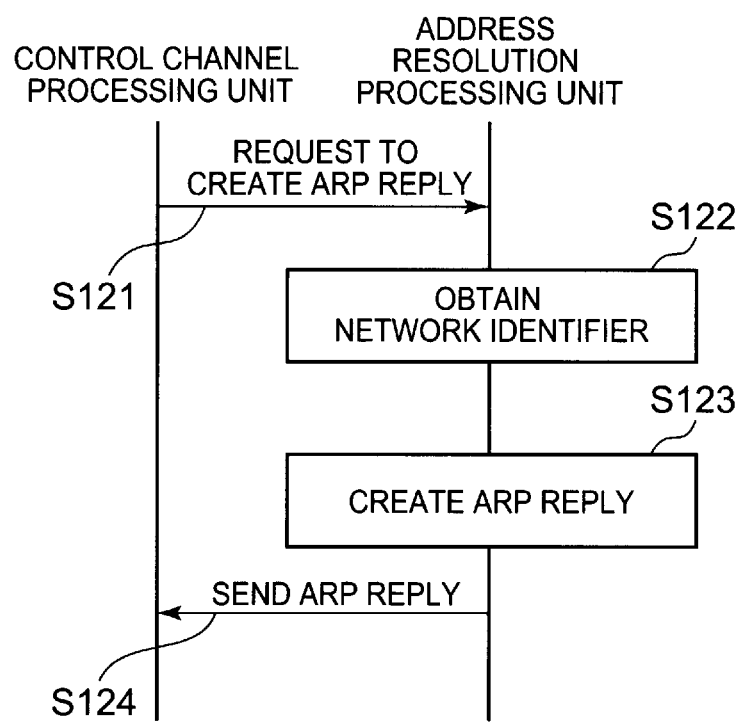
FIG. 7 is a sequence diagram showing an example of an operation of the control server when creating an ARP reply.

The following describes the operation in step S104, with reference to a sequence diagram illustrated in FIG. 7. FIG. 7 is a sequence diagram showing an example of the operation of the control server 100 when creating the ARP reply.

In the control server 100, the control channel processing unit 101 requests the address resolution processing unit 104 to create the ARP reply to the ARP request (hereafter referred to as a processing target ARP request) received from the forwarding node via the control channel (step S121). Here, the control channel processing unit 101 notifies the address resolution processing unit 104 of the processing target ARP request and information of the forwarding node and the port receiving the processing target ARP request, as parameters.

The address resolution processing unit 104 in the control server 100 obtains the network identifier of the user network to which the communication device 300-1 which is the communication device sending the processing target ARP request belongs, with reference to the network information stored in the network information storage unit 106 (step S122).

The address resolution processing unit 104 in the control server 100 then creates the ARP reply in which the network identifier obtained in step S122 is included in the MAC address as a result of resolution (resolved address), as the reply to the target processing ARP request (step S123). For instance, the created ARP reply includes a destination MAC address, a source MAC address, and a sender hardware address, a sender protocol address, a target hardware address, and a target protocol address which are information of the ARP reply, as shown below. The following shows an example of the created ARP reply.

Destination MAC address: the MAC address of the communication device sending the ARP request
Source MAC address: the network identifier obtained in step S122
ARP opcode: reply
ARP sender hardware address: the network identifier obtained in step S122
ARP sender protocol address: the target protocol address in the ARP request
ARP target hardware address: the sender hardware address in the ARP request
ARP target protocol address: the sender protocol address in the ARP request Note that, in the case where the ARP target protocol address in the processing target ARP request is the IP address of the communication device sending the processing target ARP request in step S123, the address resolution processing unit 104 in the control server 100 may stop the processing for the processing target ARP request.

The address resolution processing unit 104 in the control server 100 notifies the control channel processing unit 101 in the control server 100 of the ARP reply created in step S123 (step S124).

Figure 8:
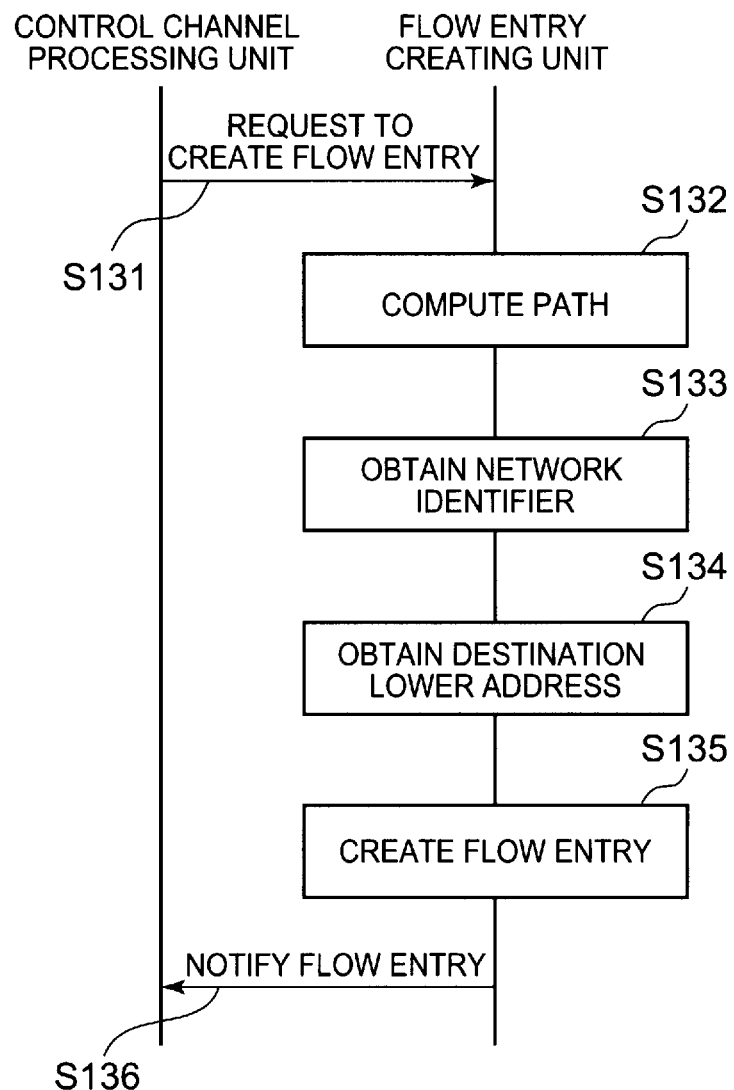
FIG. 8 is a sequence diagram showing an example of an operation of the control server when creating a flow entry.

The following describes the operation in step S110, with reference to a sequence diagram illustrated in FIG. 8. FIG. 8 is a sequence diagram showing an example of the operation of the control server 100 when creating the flow entry.

In the control server 100, the control channel processing unit 101 requests the flow entry creating unit 105 to create the flow entry corresponding to the processing target packet received from the forwarding node via the control channel (step S131). Here, the control channel processing unit 101 notifies the flow entry creating unit 105 of the processing target packet and information of the forwarding node and the port receiving the processing target packet, as parameters.

The flow entry creating unit 105 in the control server 100 computes the path of the processing target packet (step S132). It is assumed here that the path from the communication device 300-1 to the communication device 300-2 is computed as the communication device 300-1→the forwarding node 200-1→the forwarding node 200-2→the communication device 300-2.

The flow entry creating unit 105 in the control server 100 obtains the network identifier of the user network to which the communication device sending the processing target packet belongs, with reference to the network information stored in the network information storage unit 106 (step S133).

The flow entry creating unit 105 in the control server 100 obtains the MAC address (lower address) of the destination communication device of the processing target packet, with reference to the topology information stored in the topology information storage unit 107 (step S134).

The flow entry creating unit 105 in the control server 100 then creates the flow entry to be added to each forwarding node on the path computed in step S132 (step S135). Here, the flow entry creating unit 105 creates a separate flow entry for the last forwarding node on the path. In detail, the flow entry creating unit 105 creates a flow entry in which a process of changing the destination MAC address of the packet, in which the logical network identifier is set, to the MAC address of the destination communication device (the communication device 300-2 in this example) is defined as an action. As a result of adding such a flow entry to the flow table in the forwarding node, the last forwarding node on the path can specify the communication device to which the packet is to be sent.

The flow entry created by the flow entry creating unit 105 includes a matching rule and an action. The matching rule includes an input port, a destination MAC address, a source MAC address, a destination IP address, and a source IP address as shown below. The following shows an example of the matching rule created by the flow entry creating unit 105.

Input port: the port connected to the immediately preceding forwarding node or communication device on the path Destination MAC address: the network identifier obtained in step S133

Source MAC address: the MAC address of the communication device sending the processing target packet Destination IP address: the destination IP address of the processing target packet Source IP address: the source IP address of the processing target packet Note that, in the case of aggregating flow entries, the flow entry creating unit 105 may set any MAC address in the source MAC address in the matching rule. Likewise, in the case of aggregating flow entries, the flow entry creating unit 105 may set, in the destination IP address, an IP subnet to which the destination IP address of the processing target packet belongs, and set any IP address in the source IP address.

The flow entry creating unit 105 also sets the process such as "changing a destination MAC address of a packet to a designated value" (this action is set only in the last forwarding node on the path) and "outputting a packet from a designated port", as the action.

Here, the flow entry creating unit 105 designates the MAC address of the destination communication device obtained in step S134, as the destination MAC address of the packet. The flow entry creating unit 105 also designates the port connected to the next forwarding node or communication device on the path, as the output port.

In the control server 100, the flow entry creating unit 105 notifies the control channel processing unit 101 of the flow entry created in step S135 (step S136). The flow entry is then added to the flow table in each forwarding node. An entry including a network identifier is created in an ARP cache in each communication device, and a packet including the network identifier is sent from the communication device. Hence, when receiving the packet, the forwarding processing unit 202 in each forwarding node can perform path control of the packet corresponding to the network identifier based on the added flow entry.

FIG. 9 is an explanatory diagram showing an example of the flow table stored in the forwarding node. The flow table illustrated in FIG. 9 is an example of the flow table stored in each of the forwarding nodes 200-1 to 200-3 after the communication device 300-1 sends a packet to the communication device 300-2 and the communication device 300-3 sends a packet to the communication device 300-4.

In detail, FIG. 9(A) shows an example of the flow table stored in the forwarding node 200-1, FIG. 9(B) shows an example of the flow table stored in the forwarding node 200-2, and FIG. 9(C) shows an example of the flow table stored in the forwarding node 200-3. When any of the forwarding nodes 200-1 to 200-3 receives a packet that matches a matching rule illustrated in FIG. 9, the forwarding processing unit 202 in the forwarding node executes an action corresponding to the matching rule.

Figure 10:
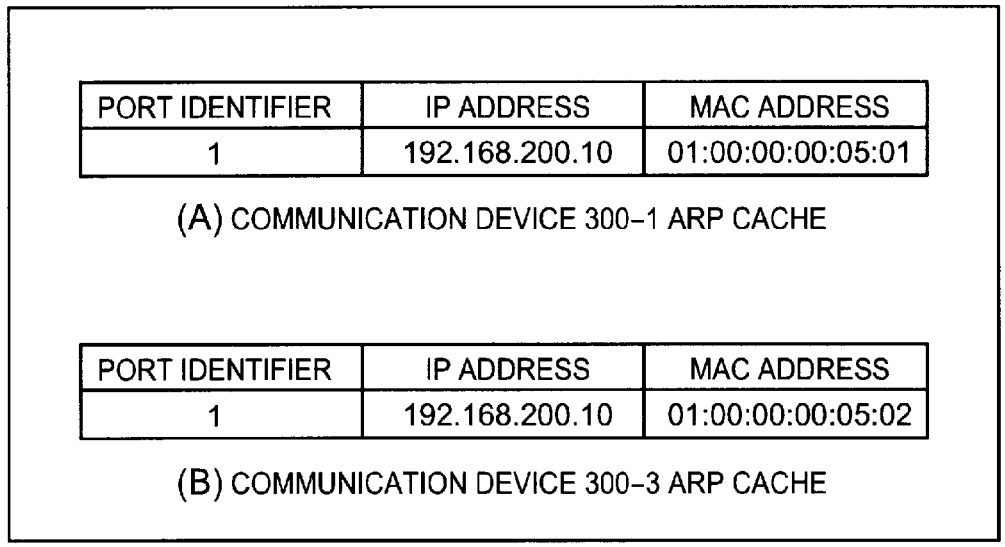
FIG. 10 is an explanatory diagram showing an example of an ARP cache entry.

FIG. 10 is an explanatory diagram showing an example of the ARP cache entry stored in the communication device. The ARP cache entry illustrated in FIG. 10 is an example of the ARP cache entry stored in each of the communication devices 300-1 and 300-3 after an ARP reply.

In detail, FIG. 10(A) shows an example of the ARP cache stored in the communication device 300-1, and FIG. 10(B) shows an example of the ARP cache stored in the communication device 300-3. Upon receiving the ARP reply, each communication device stores the combination of the IP address and the MAC address of the destination communication device, in a memory (not shown) or the like.

Though the operation of the communication control system in Exemplary Embodiment 1 is described using an example where the communication device 300-1 executes ARP processing with the IP address of the communication device 300-2 which is the destination of the packet being subjected to resolution, the target of IP address resolution by ARP processing is not limited to the communication device 300-2 which is the destination of the packet. The target of IP address resolution may be a communication device that forwards the packet received from the communication device 300-1 to another device, such as a default router set in the communication device 300-1. ARP processing performed in this case is the same as the above-mentioned processing.

As described above, according to Exemplary Embodiment 1 of the present invention, in response to the interlayer address resolution request from the communication device 300-1, the address resolution processing unit 104 in the control server 100 returns the interlayer address resolution reply that includes the network identifier of the user network to which the communication device 300-1 belongs. That is, upon receiving the interlayer address resolution request from the forwarding node 200-1, the address resolution processing unit 104 in the control server 100 sets the logical network identifier of the logical network to which the communication device 300-1 belongs, in the resolved address in response to the request. This achieves efficient interlayer address resolution. In detail, according to Exemplary Embodiment 1, interlayer address resolution can be performed efficiently without broadcasting.

Moreover, the forwarding processing unit 202 in each of the forwarding nodes 200-1 to 200-3 uses a network identifier for identifying a flow in each user network. This enables multiplexing of a plurality of user network services that use overlapping address spaces. Since the network identifier is common to communication devices belonging to the user network, it is also possible to aggregate flow entries.

A variation of Exemplary Embodiment 1 is described below. Though the communication control system in Exemplary Embodiment 1 is described using an example where the control server 100 creates the ARP reply to the ARP request, the present invention is not limited to this. The forwarding nodes 200-1 to 200-3 may create the ARP reply to the ARP request. This can be achieved, for example, by including the structure corresponding to the network information management unit 102, the network information storage unit 106, and the address resolution processing unit 104 of the control server 100, in the forwarding nodes 200-1 to 200-3.

Figure 11:
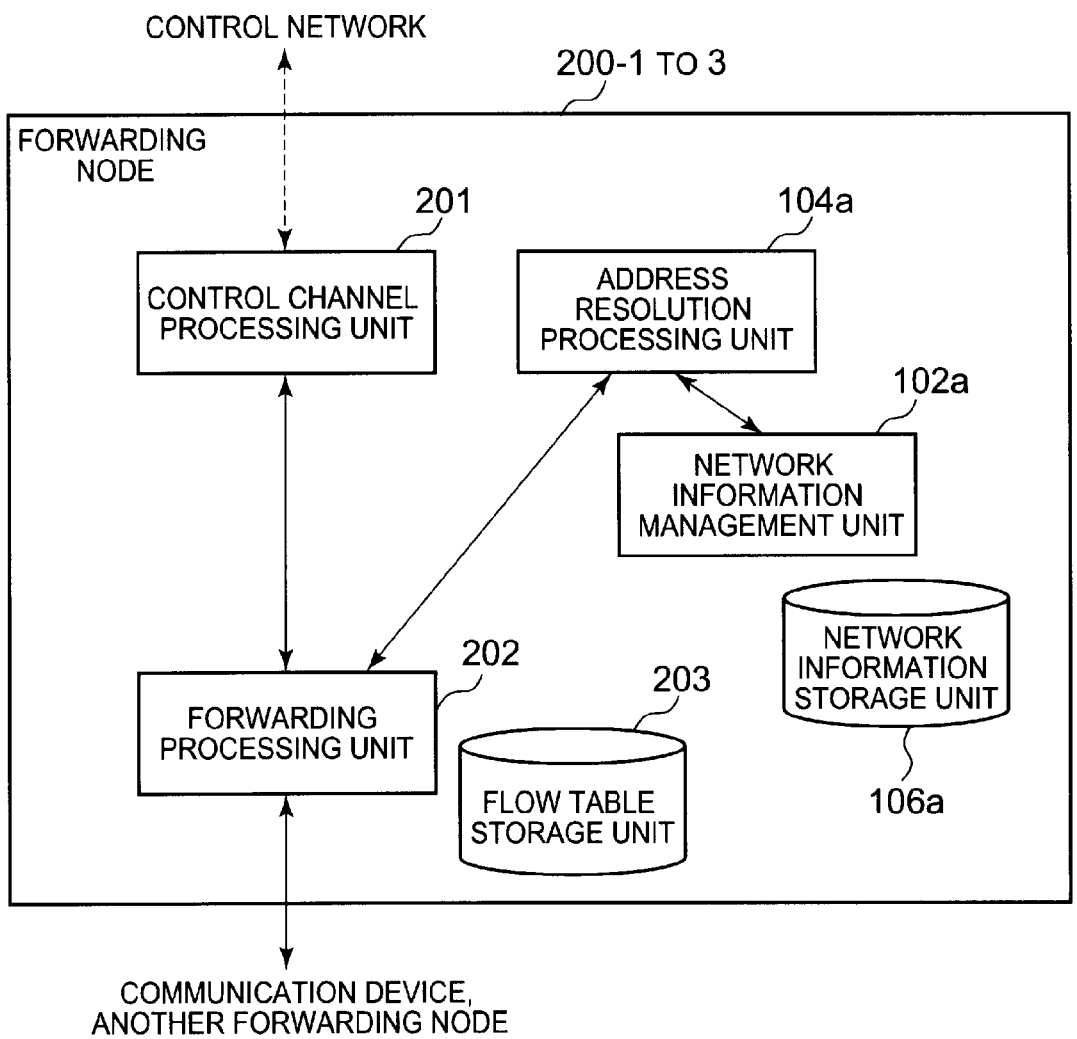
FIG. 11 is a block diagram showing an example of a structure of a forwarding node in a variation of Exemplary Embodiment 1.

FIG. 11 is a block diagram showing an example of a structure of the forwarding node in the variation of Exemplary Embodiment 1. The forwarding node in this variation includes the control channel processing unit 201, the forwarding processing unit 202, a network information management unit 102a, a network information storage unit 106a, and an address resolution processing unit 104a. The network information management unit 102a, the network information storage unit 106a, and the address resolution processing unit 104a are respectively the same as the network information management unit 102, the network information storage unit 106, and the address resolution processing unit 104 in Exemplary Embodiment 1. The network information stored in the network information storage unit 106a in each of the forwarding nodes 200-1 to 200-3 may be set statically or automatically. Alternatively, the network information management unit 102a may store the network information notified from the control server 100, in the network information storage unit 106a.

In detail, when any of the forwarding nodes 200-1 to 200-3 receives an ARP request whose corresponding flow entry does not exist from a communication device, the received ARP request is notified to the address resolution processing unit 104a in the forwarding node, instead of being sent to the control server 100 by the control channel processing unit 201. An ARP reply created by the address resolution processing unit 104a is then sent to the communication device sending the ARP request. Such a structure also enables path control using a network identifier.

That is, upon receiving the interlayer address resolution request from the communication device 300-1, the address resolution processing unit 104a in the forwarding node 200-1 sets the logical network identifier of the logical network to which the communication device 300-1 belongs, in the resolved address in response to the request. According to such a structure, too, interlayer address resolution can be performed efficiently and, in the case of multiplexing a plurality of network services, flow entries indicating processes for packets can be aggregated.

The control channel processing unit 201, the forwarding processing unit 202, the network information management unit 102a, and the address resolution processing unit 104a are realized by a CPU of a computer operating according to a program (communication control program). Alternatively, the control channel processing unit 201, the forwarding processing unit 202, the network information management unit 102a, and the address resolution processing unit 104a may be each realized by dedicated hardware.

Though the communication control system in Exemplary Embodiment 1 is described using an example where the number of network identifiers of the user network to which the communication device belongs is one, the present invention is not limited to this. The number of network identifiers of the user network to which the communication device belongs may be more than one.

In such a case, for example, information associating a plurality of network identifiers corresponding to one user network with a selection criterion for selecting a network identifier is stored in the network information storage unit 106 as the network information. When performing address resolution, the address resolution processing unit 104 selects the network identifier to be used as the resolved address, based on information included in the address resolution request, information indicating the communication device sending the address resolution request, and the selection criterion stored in the network information storage unit 106. Thus, the address resolution processing unit 104 can obtain an appropriate network identifier.

Moreover, the flow entry creating unit 105 may perform path computation in consideration of the network identifier relating to the processing target packet. In this case, the flow entry creating unit 105 may obtain the network identifier relating to the processing target packet using the network information in the network information storage unit 106, in the same manner as the address resolution processing unit 104. As an alternative, the flow entry creating unit 105 may obtain the network identifier relating to the processing target packet, from the destination lower layer address field in the processing target packet.

Though the communication control system in Exemplary Embodiment 1 is described using an example where the number of user networks to which the communication device belongs is one, the present invention is not limited to this. The communication device may belong to a plurality of user networks.

In such a case, for example, information associating a plurality of user networks corresponding to one communication device with a selection criterion for selecting a user network is stored in the network information storage unit 106 as the network information. When performing address resolution, the address resolution processing unit 104 selects the network identifier to be used as the resolved address, based on information included in the address resolution request, information indicating the communication device sending the address resolution request, and the selection criterion stored in the network information storage unit 106. Thus, the address resolution processing unit 104 can obtain an appropriate network identifier.

Exemplary Embodiment 2

The following describes a communication control system in Exemplary Embodiment 2 of the present invention.

As described above, in the communication control system according to the present invention, in response to an interlayer address resolution request sent from a communication device, a network identifier of a user network to which the communication device belongs is returned instead of an actual lower address indicating a communication device subjected to address resolution. Moreover, in the communication control system in Exemplary Embodiment 1, as a source MAC address of a packet which a communication device (e.g. the communication device 300-2 in Exemplary Embodiment 1) receives from a device in communication (e.g. the communication device 300-1 in Exemplary Embodiment 1), an actual lower address of the device in communication is set.

In recent years, there is a communication device equipped with a communication protocol stack or security software that outputs a warning log or breaks communication in the case of a mismatch between the lower layer address obtained by interlayer address resolution and the source lower address in the received packet. In view of this, Exemplary Embodiment 2 describes a communication control system as a result of modifying Exemplary Embodiment 1 so as to allow communication with a communication device equipped with such a communication protocol stack or security software.

The control server 100 in Exemplary Embodiment 2 has the structure and the function of the control server 100 in Exemplary Embodiment 1, and operates in the same way as the control server 100 in Exemplary Embodiment 1. The control server 100 in Exemplary Embodiment 2, however, differs from the control server 100 in Exemplary Embodiment 1, in the action of the flow entry to be added to the forwarding node connected to the destination communication device of the packet. In detail, the flow entry creating unit 105 in the control server 100 in Exemplary Embodiment 2 also sets an action of changing the source lower address of the packet to the network identifier of the user network to which the source communication device of the packet belongs, in the flow entry. The difference of the communication control system in Exemplary Embodiment 2 from the communication control system in Exemplary Embodiment 1 is described below, with reference to FIG. 8. Note that steps S131 to S134 from when the flow entry creation request is received to when the MAC address of the destination communication device is obtained are the same as those in Exemplary Embodiment 1.

The flow entry creating unit 105 in the control server 100 creates the flow entry based on the request received from the control channel processing unit 101 (step S135), and notifies the control channel processing unit 101 of the created flow entry (step S136). Here, the flow entry creating unit 105 creates such a flow entry in which a process of changing the source address of the packet from the address of the source communication device (the communication device 300-1 in this example) to the logical network identifier of the logical network to which the communication device (the communication device 300-1) belongs is defined as an action. As a result of adding such a flow entry to the flow table in the forwarding node, a mismatch between the lower layer address obtained by interlayer address resolution and the source lower address in the received packet can be eliminated.

The flow entry created by the flow entry creating unit 105 includes a matching rule and an action, as in Exemplary Embodiment 1. The matching rule includes an input port, a destination MAC address, a source MAC address, a destination IP address, and a source IP address as shown below. The following shows an example of a matching rule of a flow entry created by the flow entry creating unit 105 as the flow entry to be added to the last forwarding node on the path computed in step S132.

Input port: the port connected to the immediately preceding forwarding node or communication device on the path
Destination MAC address: the network identifier obtained in step S133
Source MAC address: the MAC address of the communication device sending the processing target packet
Destination IP address: the destination IP address of the processing target packet
Source IP address: the source IP address of the processing target packet As in Exemplary Embodiment 1, in the case of aggregating flow entries, the flow entry creating unit 105 may set any MAC address in the source MAC address in the matching rule. Likewise, in the case of aggregating flow entries, the flow entry creating unit 105 may set, in the destination IP address, an IP subnet to which the destination IP address of the processing target packet belongs, and set any IP address in the source IP address.

The flow entry creating unit 105 also sets the process such as "changing a destination MAC address of a packet to a designated value", "changing a source MAC address of a packet to a designated value", and "outputting a packet from a designated port", as the action.

As in Exemplary Embodiment 1, the flow entry creating unit 105 designates the MAC address of the destination communication device obtained in step S134, as the destination MAC address of the packet. The flow entry creating unit 105 also designates the port connected to the next communication device on the path, as the output port. Further, the flow entry creating unit 105 in Exemplary Embodiment 2 designates the network identifier obtained in step S133, as the source MAC address of the packet.

FIG. 12 is an explanatory diagram showing an example of the flow table stored in the forwarding node. The flow table illustrated in FIG. 12 is an example of the flow table stored in each of the forwarding nodes 200-1 to 200-3 after the communication device 300-1 sends a packet to the communication device 300-2 and the communication device 300-3 sends a packet to the communication device 300-4.

In detail, FIG. 12(A) shows an example of the flow table stored in the forwarding node 200-1, FIG. 12(B) shows an example of the flow table stored in the forwarding node 200-2, and FIG. 12(C) shows an example of the flow table stored in the forwarding node 200-3. The flow table stored in the forwarding node 200-1 illustrated in FIG. 12(A) is the same as the flow table illustrated in FIG. 9(A). On the other hand, the flow table stored in the forwarding node 200-2 illustrated in FIG. 12(B) and the flow table stored in the forwarding node 200-3 illustrated in FIG. 12(C) differ respectively from the flow tables illustrated in FIGS. 9(B) and 9(C), in that an action of changing a source MAC address of a packet is added.

As described above, according to Exemplary Embodiment 2 of the present invention, the same advantageous effects as in Exemplary Embodiment 1 can be attained even with a communication device that outputs a warning log or breaks communication in the case of a mismatch between the lower layer address obtained by interlayer address resolution and the source lower address in the received packet.

Exemplary Embodiment 3

The following describes a communication control system in Exemplary Embodiment 3 of the present invention. Though an example where the control server 100 creates the reply to the interlayer resolution request is described in Exemplary Embodiment 1 as an example of a communication control system according to the present invention, the present invention is not limited to this. The forwarding nodes 200-1 to 200-3 may create the reply to the interlayer resolution request, instead of the control server 100.

The control server 100 in Exemplary Embodiment 3, upon receiving the ARP request from any of the forwarding nodes 200-1 to 200-3, instructs the forwarding node sending the ARP request to add an action of a flow entry including a process of creating an ARP reply. The forwarding nodes 200-1 to 200-3 in Exemplary Embodiment 3 each perform a process of creating an ARP reply as an action of a flow entry. The difference of the communication control system in Exemplary Embodiment 3 from the communication control system in Exemplary Embodiment 1 is described below.

Figure 13:
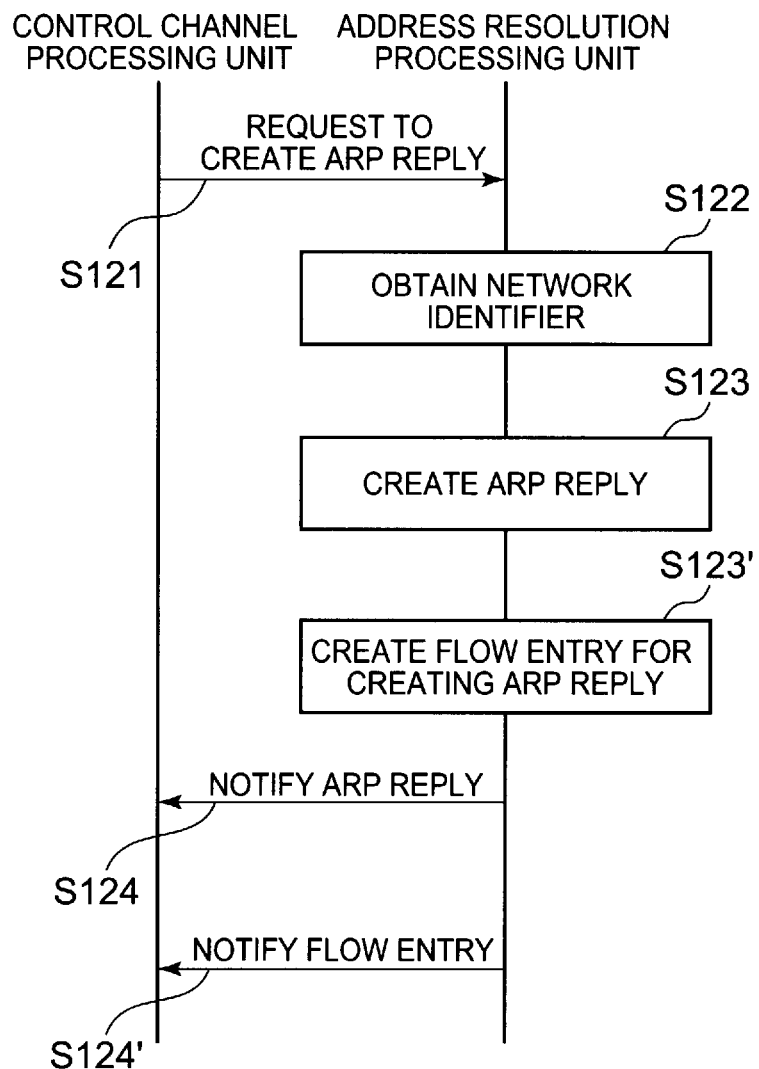
FIG. 13 is a sequence diagram showing an example of an operation of a control server when creating an ARP reply.

FIG. 13 is a sequence diagram showing an example of an operation of the control server 100 when creating the ARP reply. Steps S121 to S122 from when the control channel processing unit 101 requests the address resolution processing unit 104 to create the ARP reply to when the address resolution processing unit 104 obtains the network identifier are the same as those illustrated in FIG. 7.

The address resolution processing unit 104 in the control server 100 creates an ARP reply in which the network identifier obtained in step S122 is included in the MAC address as a result of resolution (resolved address), as the reply to the target processing ARP request (step S123). In addition, the flow entry creating unit 105 creates a flow entry for instructing the forwarding node to create and send an ARP reply in which the network identifier obtained in step S133 is included as the MAC address as a result of resolution (resolved address) (step S123').

The flow entry created by the flow entry creating unit 105 includes a matching rule and an action, as in Exemplary Embodiment 1. The matching rule includes an input port, a destination MAC address, a source MAC address, a protocol type, information indicating an ARP request, and a target protocol address as shown below. The following shows an example of the matching rule of the flow entry created by the flow entry creating unit 105.

Input port: the port connected to the communication device sending the ARP request
Destination MAC address: a broadcast MAC address or any MAC address
Source MAC address: the MAC address of the communication device sending the ARP request
Protocol type: ARP
ARP opcode: request
Target protocol address: any IP address The flow entry creating unit 105 also sets the process such as "creating an ARP reply in which a designated MAC address is included in a source MAC address and a sender hardware address field" and "outputting a packet from a designated port", as the action.

Here, the flow entry creating unit 105 designates the network identifier obtained in step S122, as the source MAC address and the value of the sender hardware address field. The flow entry creating unit 105 also designates the port connected to the communication device sending the ARP request, as the output port.

In the control server 100, the address resolution processing unit 104 notifies the control channel processing unit 101 of the ARP reply created in step S123 (step S124). Moreover, the flow entry creating unit 105 notifies the control channel processing unit 101 of the flow entry created in step S123' (step S124').

Figure 14:
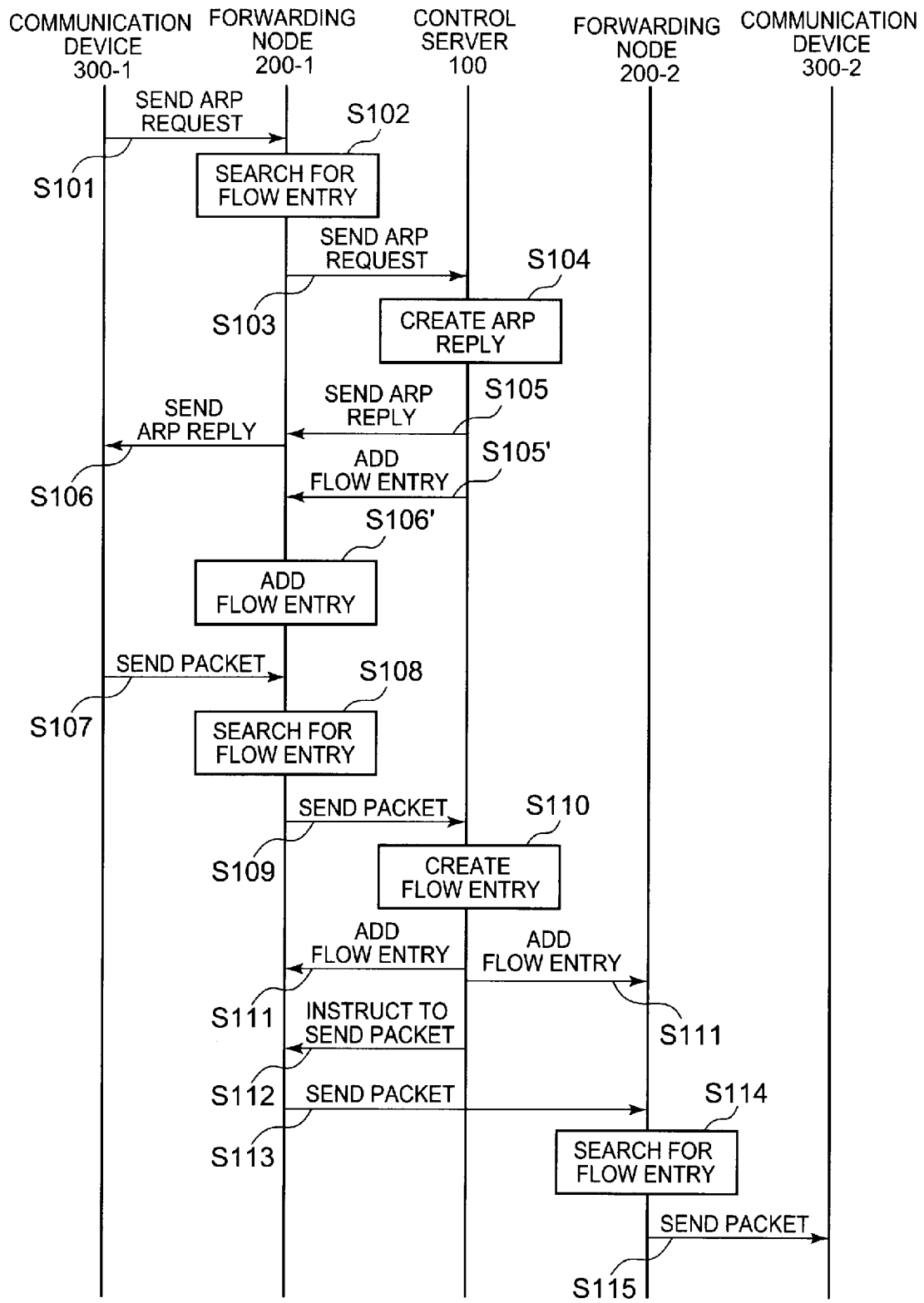
FIG. 14 is a sequence diagram showing an example of an operation of a communication control system in Exemplary Embodiment 3 of the present invention.

The following describes an operation of the communication control system in Exemplary Embodiment 3. FIG. 14 is a sequence diagram showing an example of the operation of the communication control system in Exemplary Embodiment 3. Steps S101 to S103 from when the communication device 300-1 sends the ARP request to when the forwarding node 200-1 sends the ARP request to the control server 100 are the same as steps S101 to S103 in FIG. 6. In step S104, steps S121 to S124' illustrated in FIG. 13 are performed.

The control channel processing unit 101 in the control server 100 instructs the forwarding node 200-1 to send the ARP reply created in step S104 to the communication device 300-1, via the control channel (step S105). The control channel processing unit 101 in the control server 100 also instructs the forwarding node 200-1 to add the flow entry received in step S124' to the flow table (step S105').

Upon receiving the ARP reply sent in step S105, the forwarding processing unit 202 in the forwarding node 200-1 sends the received ARP reply to the communication device 300-1 (step S106). The forwarding processing unit 202 in the forwarding node 200-1 also adds the flow entry received in step S124', to the flow table (step S106'). Subsequent steps S107 to S115 from when the communication device 300-1 sends the packet to when the communication device 300-2 receives the packet are the same as steps S107 to S115 in FIG. 6.

Figure 15:
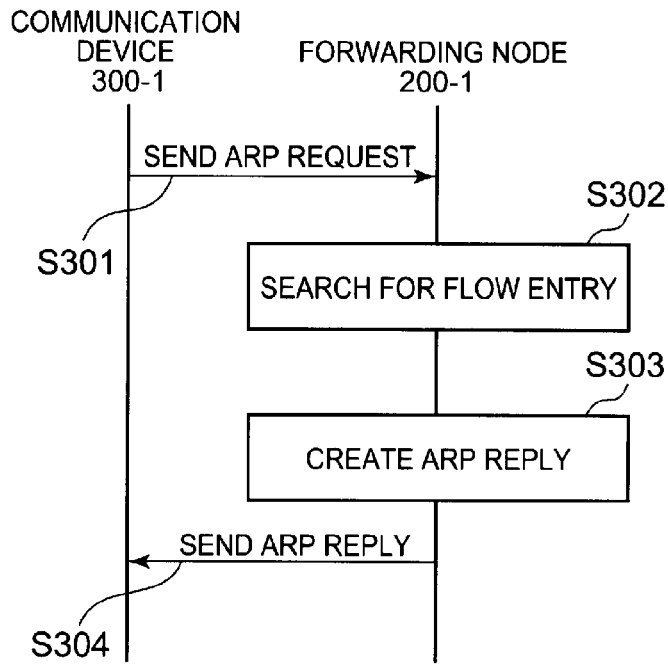
FIG. 15 is a sequence diagram showing an example of an ARP reply operation of a forwarding node.

The following describes an ARP reply operation of the forwarding node when the communication device 300-1 performs address resolution for the IP address of the communication device 300-2. FIG. 15 is a sequence diagram showing an example of the ARP reply operation of the forwarding node. It is assumed here that, before the operation illustrated in FIG. 15 starts, steps S123', S124', S105', and S106' mentioned above have been executed at least once.

First, the communication device 300-1 sends an ARP request in which the IP address (target protocol address) subjected to resolution is the IP address of the communication device 300-2, to the forwarding node 200-1 (step S301).

When the forwarding node 200-1 receives the ARP request, the forwarding processing unit 202 in the forwarding node 200-1 searches for a flow entry corresponding to the received ARP request (step S302). In this case, the flow entry corresponding to the received ARP request has been added in step S106', and so exists in the flow table.

Accordingly, the forwarding processing unit 202 in the forwarding node 200-1 creates an ARP reply based on an action of the flow entry found in step S302 (step S303). For instance, the created ARP reply includes a destination MAC address, a source MAC address, and a sender hardware address, a sender protocol address, a target hardware address, and a target protocol address which are information of the ARP reply, as shown below. The following shows an example of the created ARP reply.

Destination MAC address: the MAC address of the communication device sending the ARP request
Source MAC address: the value designated in the action of the flow entry
ARP opcode: reply
ARP sender hardware address: the value designated in the action of the flow entry
ARP sender protocol address: the target protocol address in the ARP request
ARP target hardware address: the sender hardware address in the ARP request
ARP target protocol address: the sender protocol address in the ARP request Here, the network identifier (i.e. the value designated in step S123') of the user network to which the communication device sending the ARP request belongs is set in the source MAC address and the ARP sender hardware address.

Note that, in the case where the ARP target protocol address in the ARP request is the IP address of the communication device sending the ARP request in step S303, the forwarding processing unit 202 in the forwarding node 200-1 may stop the processing for the ARP request.

The forwarding processing unit 202 in the forwarding node 200-1 sends the ARP reply created in step S303 to the communication device 300-1, based on the action of the flow entry found in step S302 (step S304).

As described above, according to Exemplary Embodiment 3 of the present invention, an advantageous effect of reducing the number of ARP requests and ARP replies communicated between the control server 100 and the forwarding nodes 200-1 to 200-3 can be attained in addition to the advantageous effects of Exemplary Embodiment 1.

Though the communication control system in Exemplary Embodiment 3 is described using an example where the forwarding processing unit 202 in each forwarding node adds the flow entry corresponding to the ARP request to the flow table based on the reception of the ARP request, the present invention is not limited to this. The flow entry corresponding to the ARP request may be added to the flow table in each forwarding node beforehand, prior to the reception of the ARP request.

As an example, the control server 100 performs steps S122, S123, S123', S124, and S124' when a communication device is newly connected to a forwarding node. By doing so, the flow entry corresponding to the ARP request can be added to the flow table beforehand.

Figure 16:
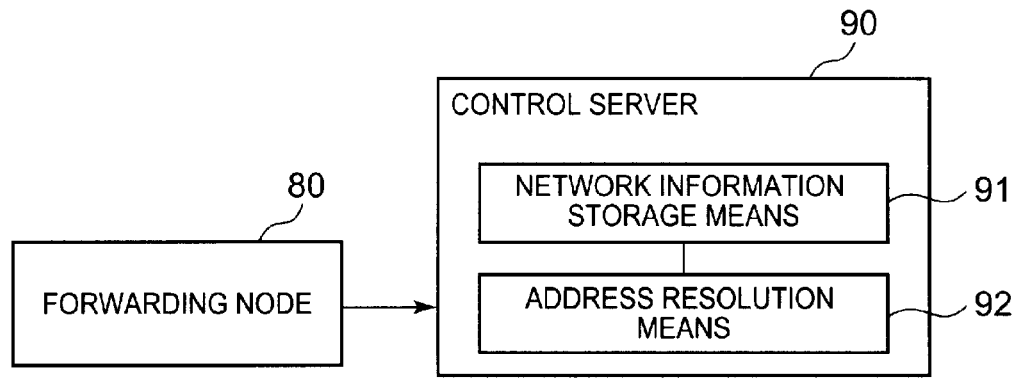
FIG. 16 is a block diagram showing an example of a minimum structure of a communication control system according to the present invention.

The following describes a minimum structure of the present invention. FIG. 16 is a block diagram showing an example of a minimum structure of a communication control system according to the present invention. The communication control system according to the present invention comprises: a forwarding node 80 (e.g. the forwarding nodes 200-1 to 200-3) for holding a process rule (e.g. a flow entry) defining a feature of a packet and a process for the packet corresponding to the feature, and processing the packet received from another device based on the process rule; and a control server 90 (e.g. the control server 100) for controlling the process rule held in the forwarding node 80.

The control server 90 includes: network information storage means 91 (e.g. the network information storage unit 106) for storing a logical network identifier which is an identifier of a logical network defined by setting of the forwarding node 80, and a correspondence relation between a device connected to the forwarding node 80 and the logical network; and address resolution means 92 (e.g. the address resolution processing unit 104) for, upon receiving from the forwarding node 80 an address resolution request (e.g. an ARP request) for a destination communication device (e.g. the communication device 300-2) which is a destination of the packet or a communication device (e.g. a default router) for forwarding the packet received from a source communication device (e.g. the communication device 300-1) which is a source of the packet to another device, performing interlayer address resolution for the destination communication device or the communication device, and setting the logical network identifier of the logical network to which the source communication device belongs, in a resolved address (e.g. a MAC address included in an ARP reply) which is an address obtained as a result of the address resolution.

According to this structure, interlayer address resolution can be performed efficiently and, in the case of multiplexing a plurality of network services, flow entries indicating processes for packets can be aggregated.

The forwarding node may include: process rule storage means (e.g. the flow table storage unit 203) for storing the process rule; and packet processing means (e.g. the forwarding processing unit 202) for performing path control of the packet sent from the source communication device, based on the process rule, wherein the process rule storage means stores the logical network identifier, as the feature of the packet in the process rule, and wherein the packet processing means performs the path control of the packet corresponding to the logical network identifier, based on the process rule.

The process rule storage means may store the process rule (e.g. the flow entry illustrated in FIG. 9) defining, as the process for the packet, a process of changing a destination address of the packet from the logical network identifier to an address of the destination communication device which is the destination of the packet, wherein the packet processing means changes the destination address of the received packet to the address of the destination communication device, based on the process rule.

The process rule storage means may store the process rule (e.g. the flow entry illustrated in FIG. 12) defining, as the process for the packet, a process of changing a source address of the packet from an address of the source communication device to the logical network identifier of the logical network to which the source communication device belongs, wherein the packet processing means changes the source address of the received packet to the logical network identifier, based on the process rule.

The address resolution means 92 may, upon receiving the address resolution request, create a process rule (e.g. the flow entry created in step S123') defining a process of creating an interlayer address resolution reply packet based on the address resolution request in response to the address resolution request and a process of sending the interlayer address resolution reply packet to the source communication device, and instructs the forwarding node 80 to set the created process rule, the interlayer address resolution reply packet being a packet in which the logical network identifier of the logical network to which the source communication device belongs is set in the resolved address.

Figure 17:
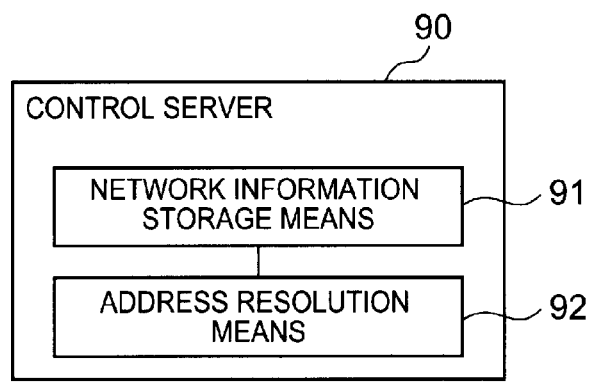
FIG. 17 is a block diagram showing an example of a minimum structure of a control server according to the present invention.

FIG. 17 is a block diagram showing an example of a minimum structure of a control server according to the present invention. The control server illustrated in FIG. 17 is the same as the control server 90 illustrated in FIG. 16.

Figure 18:
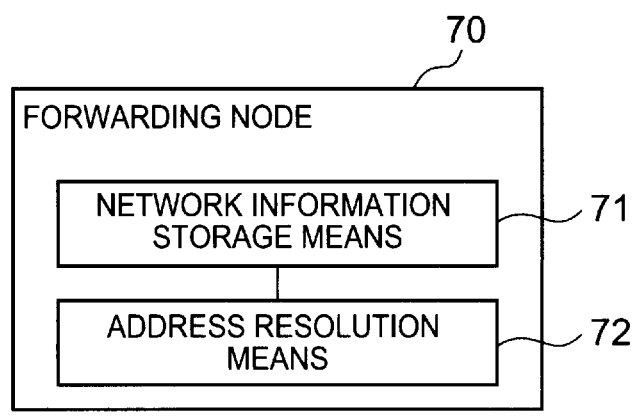
FIG. 18 is a block diagram showing an example of a minimum structure of a forwarding node according to the present invention.

FIG. 18 is a block diagram showing an example of a minimum structure of a forwarding node according to the present invention. A forwarding node 70 according to the present invention holds a process rule (e.g. a flow entry) defining a feature of a packet and a process for the packet corresponding to the feature, and processes the packet received from another device based on the process rule.

The forwarding node 70 comprises: network information storage means 71 (e.g. the network information storage unit 106a) for storing a logical network identifier which is an identifier of a logical network defined by setting of the forwarding node, and a correspondence relation between a device connected to the forwarding node and the logical network; and address resolution means 72 (e.g. the address resolution processing unit 104a) for, upon receiving, from a source communication device (e.g. the communication device 300-1) which is a source of the packet, an address resolution request (e.g. an ARP request) for a destination communication device (e.g. the communication device 300-2) which is a destination of the packet or a communication device (e.g. a default router) for forwarding the packet received from the source communication device to another device, performing interlayer address resolution for the destination communication device or the communication device, and setting the logical network identifier of the logical network to which the source communication device belongs, in a resolved address which is an address obtained as a result of the address resolution.

According to these structures, too, interlayer address resolution can be performed efficiently and, in the case of multiplexing a plurality of network services, flow entries indicating processes for packets can be aggregated.

While the present invention has been described with reference to the above exemplary embodiments, the present invention is not limited to the above exemplary embodiments. The exemplary embodiments may be combined or partially modified within the scope of the technical idea of the present invention.

This application is based upon and claims the benefit of priority from Japanese patent application No. 2011-000738, filed on Jan. 5, 2011, the disclosure of which is incorporated herein in its entirety by reference.

INDUSTRIAL APPLICABILITY

The present invention is preferably applied to a communication control system for performing centralized control of packet communication paths.

REFERENCE SIGNS LIST 100 control server
101 control channel processing unit
102, 102a network information management unit
103 topology information management unit
104, 104a address resolution processing unit
105 flow entry creating unit
106, 106a network information storage unit
107 topology information storage unit 200-1 to 200-3 forwarding node
201 control channel processing unit
202 forwarding processing unit
203 flow table storage unit
300-1 to 300-4 communication device
400 control network

The invention claimed is:

1. A communication control system, comprising:
a forwarding node for holding a process rule defining a feature of a packet and a process for the packet corresponding to the feature, and processing the packet received from another device based on the process rule; and
a control server for controlling the process rule held in the forwarding node,
wherein the control server includes:
a network information storage unit which is configured to store a logical network identifier which comprises an identifier of a logical network defined by setting of the forwarding node, and a correspondence relation between a device connected to the forwarding node and the logical network;
an address resolution unit which is configured, upon receiving from the forwarding node an address resolution request for a destination communication device which comprises a destination of the packet or a communication device for forwarding the packet received from a source communication device which comprises a source of the packet to another device, to perform interlayer address resolution for the destination communication device or the communication device, and to notify the forward node of the logical network identifier of the logical network to which the source communication device belongs, in place of a resolved address which is an address obtained as a result of the address resolution; and
a flow entry creating unit which is configured to set the process rule for transferring using the logical network identifier as the resolved address to the forwarding node except a last forwarding node on a path, and to set the process rule for changing the logical network identifier contained in the received packet to the resolved address to the last forwarding node on the path,
wherein the communication control system comprises a hardware including a processor, and each unit of the system is implemented at least by the hardware,
wherein the forwarding node comprises a hardware including a processor, and each unit of the forwarding node is implemented at least by the hardware of the forwarding node, and
wherein the control server comprises a hardware including a processor, and each unit of the control server is implemented at least by the hardware of the control server.

2. The communication control system according to claim 1, wherein the forwarding node includes:
a process rule storage unit configured to store the process rule; and
a packet processor configured to perform path control of the packet sent from the source communication device, based on the process rule,
wherein the process rule storage unit is further configured to store the logical network identifier, as the feature of the packet in the process rule,
wherein the packet processor is further configured to perform the path control of the packet corresponding to the logical network identifier, based on the process rule, and
wherein each unit of the packet processor is implemented at least by the hardware of the communication control system.

3. The communication control system according to claim 2, wherein the process rule storage unit is further configured to store the process rule defining, as the process for the packet, a process of changing a destination address of the packet from the logical network identifier to an address of the destination communication device which is the destination of the packet, and
wherein the packet processor is further configured to change the destination address of the received packet to the address of the destination communication device, based on the process rule.

4. The communication control system according to claim 2, wherein the process rule storage unit is further configured to store the process rule defining, as the process for the packet, a process of changing a source address of the packet from an address of the source communication device to the logical network identifier of the logical network to which the source communication device belongs, and
wherein the packet processor is further configured to change the source address of the received packet to the logical network identifier, based on the process rule.

5. The communication control system according to claim 1, wherein upon receiving the address resolution request, the address resolution unit is configured to create a process rule defining a process of creating an interlayer address resolution reply packet based on the address resolution request in response to the address resolution request and a process of sending the interlayer address resolution reply packet to the source communication device, and to instruct the forwarding node to set the created process rule, the interlayer address resolution reply packet comprising a packet in which the logical network identifier of the logical network to which the source communication device belongs is set in the resolved address.

6. The communication control system according to claim 1, wherein the address resolution unit is further configured to set the logical network identifier of the logical network to which the source communication device belongs, in the resolved address which comprises the address obtained as the result of the address resolution.

7. The communication control system according to claim 1, wherein the address resolution unit if further configured to perform a media access control (MAC) address resolution in response to an address resolution protocol (ARP) request, and to notify the forwarding node of the logical network identifier in place of the resolved MAC address.

8. The communication control system according to claim 1, wherein the logical network identifier is common to host devices belonging to the logical network.

9. The communication control system according to claim 1, wherein the flow entry creating unit sets the process rule using the logical network identifier in place of the resolved address to a device on the path.

10. A control server for controlling a process rule that is held in a forwarding node for processing a packet received from another device based on the process rule and that defines a feature of the packet and a process for the packet corresponding to the feature, the control server comprising:
a network information storage unit which is configured to store a logical network identifier which comprises an identifier of a logical network defined by setting of the forwarding node, and a correspondence relation between a device connected to the forwarding node and the logical network;

an address resolution unit which is configured, upon receiving from the forwarding node an address resolution request for a destination communication device which comprises a destination of the packet or a communication device for forwarding the packet received from a source communication device which comprises a source of the packet to another device, to perform interlayer address resolution for the destination communication device or the communication device, and to notify the forward node of the logical network identifier of the logical network to which the source communication device belongs, in place of a resolved address which is an address obtained as a result of the address resolution; and a flow entry creating unit which is configured to set the process rule for transferring using the logical network identifier as the resolved address to the forwarding node except a last forwarding node on a path, and to set the process rule for changing the logical network identifier contained in the received packet to the resolved address to the last forwarding node on the path, wherein the control server includes a hardware including a processor, and each unit of the control server is implemented at least by the hardware of the control server, and wherein the forwarding node comprises a hardware including a processor, and each unit of the forwarding node is implemented at least by the hardware of the forwarding node.

11. The control server according to claim 10, wherein the address resolution unit is further configured to set the logical network identifier of the logical network to which the source communication device belongs, in the resolved address which comprises the address obtained as the result of the address resolution.

12. The control server according to claim 10, wherein the address resolution unit if further configured to perform a media access control (MAC) address resolution in response to an address resolution protocol (ARP) request, and to notify the forwarding node of the logical network identifier in place of the resolved MAC address.

13. The control server according to claim 10, wherein the logical network identifier is common to host devices belonging to the logical network.

14. The control server according to claim 10, wherein the flow entry creating unit sets the process rule using the logical network identifier in place of the resolved address to a device on the path.

15. A forwarding node for holding a process rule defining a feature of a packet and a process for the packet corresponding to the feature, and processing the packet received from another device based on the process rule, the forwarding node comprising:
    a network information storage unit which is configured to store a logical network identifier which comprises an identifier of a logical network defined by setting of the forwarding node, and a correspondence relation between a device connected to the forwarding node and the logical network;
    an address resolution unit which is configured, upon receiving, from a source communication device which is a source of the packet, an address resolution request for a destination communication device which comprises a destination of the packet or a communication device for forwarding the packet received from the source communication device to another device, to perform interlayer address resolution for the destination communication device or the communication device, and to notify the forward node of the logical network identifier of the logical network to which the source communication device belongs, in place of a resolved address which comprises an address obtained as a result of the address resolution; and
    a flow entry creating unit which is configured to set the process rule for transferring using the logical network identifier as the resolved address to the forwarding node except a last forwarding node on a path, and to set the process rule for changing the logical network identifier contained in the received packet to the resolved address to the last forwarding node on the path,
    wherein the forwarding node comprises a hardware including a processor, and each unit of the forwarding node is implemented at least by the hardware of the forwarding node.

16. The forwarding node according to claim 15, wherein the address resolution unit is further configured to set the logical network identifier of the logical network to which the source communication device belongs, in the resolved address which comprises the address obtained as the result of the address resolution.

17. The forwarding node according to claim 15, wherein the address resolution unit if further configured to perform a media access control (MAC) address resolution in response to an address resolution protocol (ARP) request, and to notify the forwarding node of the logical network identifier in place of the resolved MAC address.

18. A communication control method, wherein a control server including a network information storage unit which is configured to store a logical network identifier which comprises an identifier of a logical network defined by setting of a forwarding node for processing a packet received from another device based on a process rule defining a feature of the packet and a process for the packet corresponding to the feature, and a correspondence relation between a device connected to the forwarding node and the logical network performs, upon receiving from the forwarding node an address resolution request for a destination communication device which comprises a destination of the packet or a communication device for forwarding the packet received from a source communication device which comprises a source of the packet to another device, interlayer address resolution for the destination communication device or the communication device, and
    wherein the control server is configured to notify the forwarding node of the logical network identifier of the logical network to which the source communication device belongs, in place of a resolved address which comprises an address obtained as a result of the address resolution, the method comprising:
    setting the process rule for transferring using the logical network identifier as the resolved address to the forwarding node except a last forwarding node on a path; and
    setting the process rule for changing the logical network identifier contained in the received packet to the resolved address to the last forwarding node on the path.

19. A non-transitory computer readable information recording medium storing a communication control program applied to a computer for controlling a process rule that is held in a forwarding node for processing a packet received from another device based on the process rule and that defines a feature of the packet and a process for the packet corresponding to the feature, the computer including a network information storage unit for storing a logical network identifier which comprises an identifier of a logical network defined by setting of the forwarding node, and a correspondence relation between a device connected to the forwarding node and the logical network, the communication control program, when executed by a processor, performs a method for:

upon receiving from the forwarding node an address resolution request for a destination communication device which comprises a destination of the packet or a communication device for forwarding the packet received from a source communication device which comprises a source of the packet to another device, performing interlayer address resolution for the destination communication device or the communication device, and notifying the forwarding node of the logical network identifier of the logical network to which the source communication device belongs, in place of a resolved address which is an address obtained as a result of the address resolution;

setting the process rule for transferring using the logical network identifier as the resolved address to the forwarding node except a last forwarding node on a path; and setting the process rule for changing the logical network identifier contained in the received packet to the resolved address to the last forwarding node on the path.

20. A non-transitory computer readable information recording medium storing a communication control program applied to a computer for holding a process rule defining a feature of a packet and a process for the packet corresponding to the feature, a logical network identifier which comprises an identifier of a logical network defined by setting of the computer, and a correspondence relation between a device connected to the computer and the logical network, and processing the packet received from another device based on the process rule, the communication control program, when executed by a processor, performs a method for:

upon receiving, from a source communication device which is a source of the packet, an address resolution request for a destination communication device which comprises a destination of the packet or a communication device for forwarding the packet received from the source communication device to another device, performing interlayer address resolution for the destination communication device or the communication device, and notifying the forwarding node of the logical network identifier of the logical network to which the source communication device belongs, in place of a resolved address which comprises an address obtained as a result of the address resolution;

setting the process rule for transferring using the logical network identifier as the resolved address to the forwarding node except a last forwarding node on a path; and setting the process rule for changing the logical network identifier contained in the received packet to the resolved address to the last forwarding node on the path.

* * * * *